US009225661B1

(12) United States Patent (10) Patent No.: US 9,225,661 B1
Yang et al. (45) Date of Patent: Dec. 29, 2015

(54) REMOTE CONSOLE ACCESS IN A SCALABLE CLOUD COMPUTING ENVIRONMENT

(71) Applicant: Citrix Systems, Inc., Fort Lauderdale, FL (US)

(72) Inventors: Guanghong Yang, San Jose, CA (US); Will Chan, Santa Clara, CA (US); Alex Huang, Cupertino, CA (US); Sheng Liang, Cupertino, CA (US); Chiradeep Vittal, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 245 days.

(21) Appl. No.: 14/057,438

(22) Filed: Oct. 18, 2013

Related U.S. Application Data

(63) Continuation of application No. 13/020,801, filed on Feb. 3, 2011, now abandoned.

(60) Provisional application No. 61/301,168, filed on Feb. 3, 2010.

(51) Int. Cl.
  *G06F 15/16* (2006.01)
  *H04L 12/911* (2013.01)

(52) U.S. Cl.
  CPC ..................................... *H04L 47/70* (2013.01)

(58) Field of Classification Search
  USPC ......................................... 709/235, 237, 240
  See application file for complete search history.

(56) References Cited

U.S. PATENT DOCUMENTS

| | | | |
|---|---|---|---|
| 8,200,796 B1 * | 6/2012 | Margulis | G06F 3/1431 709/217 |
| 8,260,006 B1 | 9/2012 | Callari et al. | |
| 2007/0226314 A1 * | 9/2007 | Eick | G06F 17/30896 709/217 |
| 2007/0266433 A1 | 11/2007 | Moore | |
| 2009/0222558 A1 * | 9/2009 | Xu | G06F 9/485 709/224 |
| 2009/0276771 A1 | 11/2009 | Nickolov et al. | |
| 2009/0300605 A1 | 12/2009 | Edwards et al. | |
| 2010/0100548 A1 * | 4/2010 | Scott | G06K 9/6253 707/741 |
| 2010/0169666 A1 | 7/2010 | Dewan et al. | |
| 2011/0022812 A1 | 1/2011 | van der Linden et al. | |

* cited by examiner

*Primary Examiner* — Vivek Srivastava
*Assistant Examiner* — Normin Abedin
(74) *Attorney, Agent, or Firm* — BainwoodHuang

(57) ABSTRACT

A scalable cloud infrastructure serves two or more customers, where each customer is associated with at least one unit of virtual resources. The virtual resources are established by apportioning physical resources in the cloud infrastructure that are partitioned into pods within one or more zones in a scalable manner. Additionally, the cloud infrastructure establishes one or more management server clusters each comprising one or more management servers. The two or more customers create a number of virtual machines within pods in a zone. Due to the scalability of the cloud infrastructure, a console proxy virtual machine and server is introduced to support console access to virtual machines. The console proxy server serves as an intermediary between a browser and a viewed virtual machine configured to maintain viewing session quality while minimizing network impact.

20 Claims, 23 Drawing Sheets

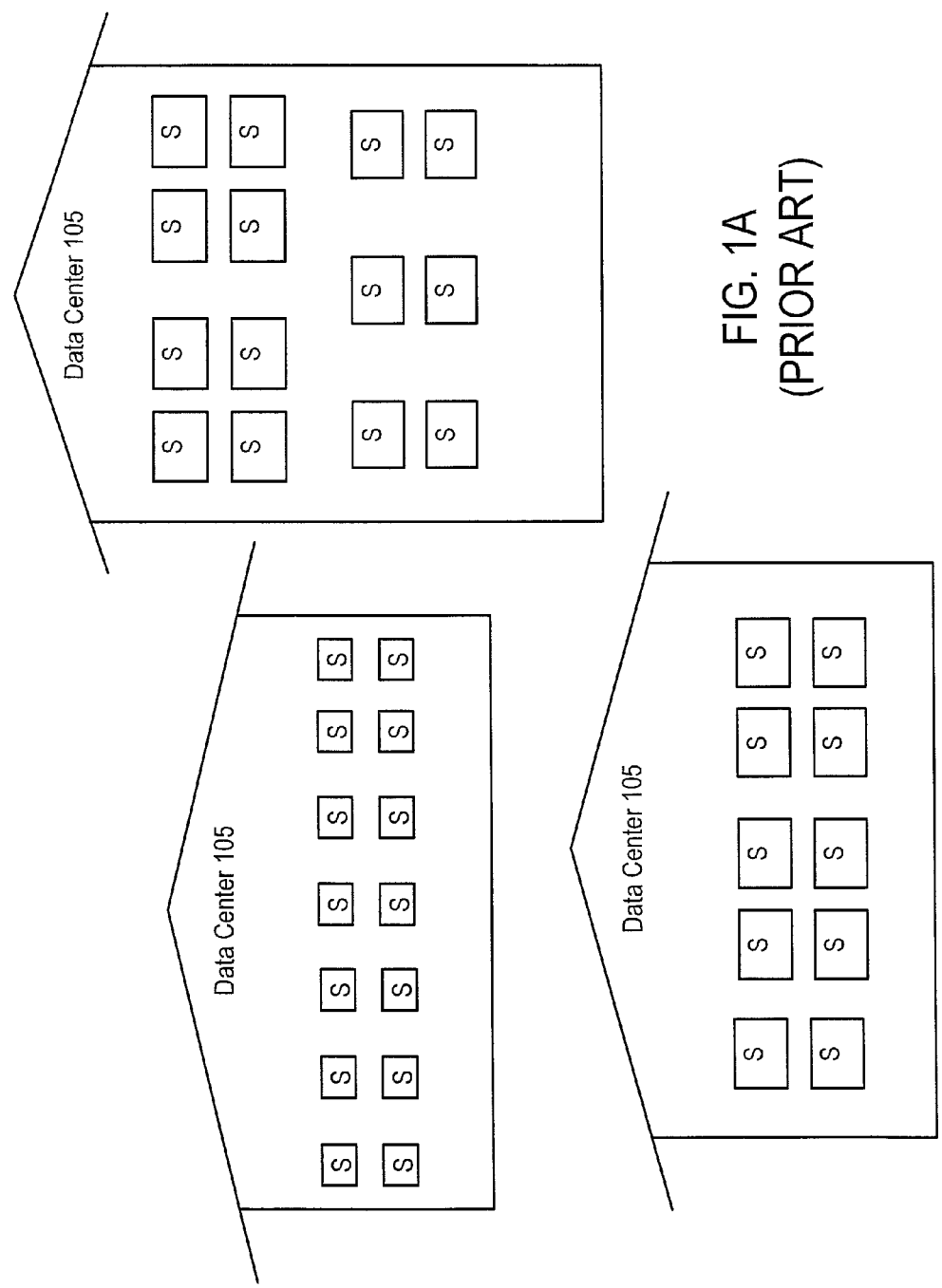

REMOTE CONSOLE ACCESS IN A SCALABLE CLOUD COMPUTING ENVIRONMENT

CROSS REFERENCE TO OTHER APPLICATIONS

This application is a continuation under 35 U.S.C. §120 of U.S. patent application Ser. No. 13/020,801 filed on Feb. 3, 2011, which is a non-provisional under 35 U.S.C. §119(e) of U.S. Patent Application No. 61/301,168 filed on Feb. 3, 2010, both these applications being incorporated by reference herein.

BACKGROUND

This disclosure generally relates to cloud computing, and, more particularly, to enabling infrastructure information technology services, including computing, storage, and networking services to be provisioned on demand and delivered over the Internet in a scalable manner.

Service providers and enterprises have traditionally relied on large local installations of commodity data center hardware, including computing, storage, and networking services, to provide information technology services and applications to their users. The advent of computing services that enable applications to run in "the cloud," or on remote data centers that provision computing, storage, and networking services to applications, has left many service providers and enterprises with a large inventory of unused commodity data center hardware.

A cloud infrastructure provides on-demand computing resources to a customer (whether an individual or an enterprise) of the cloud operator through virtualization. The customer typically is physically remote from the computing resource and is agnostic to the location of the physical resources that support the computing resources. In a virtualized cloud infrastructure, the computing resource generally comprises a virtual machine characterized by some amount of processor, memory, storage, networking capability or capacity. Virtualization allows the physical resources support a large number of computing resources, often well beyond the limited number of actual physical devices. Physical resources in the cloud infrastructure are shared amongst the different customers of the cloud infrastructure. Each customer gets the illusion of operating a physically distinct computing resource.

Traditional virtualization infrastructure is built on shared storage and shared Layer-2 (Data Link) networking. These requirements severely limit scalability of conventional cloud systems. In shared storage, the physical disks may be physically separate from the computing server. These disks are typically controlled by a dedicated computer known as a storage controller or storage server. The storage controller provides access to the physical server via network protocols such as NFS and iSCSI. The virtual machines therefore access their storage over the network, but in a transparent fashion such that their storage appears to be locally attached. Each storage server provides storage to multiple physical servers. The virtual machines access their virtual disks over the network via a hypervisor deployed on the physical servers hosting the virtual machines. The hypervisor is responsible for managing the virtual machines' access to the storage servers.

When the storage is networked in such a fashion, it may provide many advantages to the cloud operator. However, a typical infrastructure cloud is characterized by massive scale with hundreds or thousands of customers operating thousands of virtual machines simultaneously, with each customer getting the illusion of operating physically distinct computers. To support such scale, the operator needs to deploy hundreds of physical servers and the networking elements and storage to support these physical servers.

While advantageous as outlined above, commercially available storage servers are not the ideal solution. The storage servers may not scale sufficiently to support such deployments due to architectural limitations. They may be prohibitively expensive or represent more capital outlay than warranted by the initial anticipated demand for the service. They may present single points of failure or increased cost due to deployment of redundant elements. Insurmountable performance bottlenecks may be present, for example, due to the limits of networking speed. Expensive large centralized storage may require long-term technology and vendor lock-in detrimental to the competitiveness of the cloud operator.

The networking elements may provide a similar challenge in large scale cloud deployments. Typically the network between the physical servers is provided by switched Ethernet since it provides performance at optimal price points. However, interconnecting all physical servers using Layer-2 switching has a number of drawbacks.

First, each physical server uses broadcasts and multicasts to discover services and advertise services on the network. As the number of physical servers increases to accommodate a growing number of virtual machines, the amount of broadcast traffic scales accordingly. Broadcast traffic is detrimental to the performance of the network since each server is interrupted by every broadcast even if it is not relevant to the server. Commercially available network switches can often only support a few dozen physical ports—each physical server is connected to one or more ports. Switches can be linked together with high speed switches but at great expense and potentially lower reliability.

Additionally, previous virtualization technologies resorted to one of two approaches: physical host-based network virtualization using software drivers integrated in the hypervisor or physical network/VLAN-based network virtualization, either via port-based VLANs or IEEE 802.1q tagged Ethernet frames. The popular IEEE 802.1Q standard defines a 12-bit tag, which allows more than 4000 VLANs to be supported within a broadcast domain. But neither of these approaches by themselves are sufficient to build a scalable cloud infrastructure.

SUMMARY

In a cloud infrastructure, physical resources are partitioned into pods within one or more zones in a scalable manner. The physical resources comprise physical compute, storage, and networking resources within data centers distributed across a network. Each zone comprises a subset of the pods and is physically isolated from other zones in the plurality. Each pod comprises a discrete set of physical resources in a zone, which resources are tightly connected via a communications network. The physical resources across pods are weakly connected via a communications network, in contrast to the physical resources within pods. Additionally, the cloud infrastructure establishes one or more management server clusters each comprising one or more management servers. In one embodiment, resources are strongly connected by physical and data link level protocols, and weakly connected by network or higher level protocols. In another embodiment, resources are strongly connected by having relatively low latency and/or high bandwidth network links between them, and weakly connected by having high latency and/or low bandwidth network link between them.

The cloud infrastructure serves two or more customers with authenticated accounts. Each customer is associated with units of virtual resources on the cloud infrastructure. The cloud infrastructure establishes units of virtual resources by apportioning selected sets of the physical resources within the pods. The apportioned physical resources may be shared between two or more of the units of virtual resources. Each management server is configured for allocating the units of virtual resources to an account associated with each customer.

The cloud infrastructure comprises one or more data networks built from the distributed networking resources. A data network connects the pods and is configured for routing traffic to the pods from the customers of the cloud infrastructure and vice versa. The cloud infrastructure also comprises establishing one or more management networks. A management network connects the management servers to one of the zones, and connects the compute and storage resources partitioned within the pod.

A console proxy virtual machine facilitates and handles a multitude of customer viewing sessions on console proxy servers for a number of virtual machines belonging to the customer. Embodiments include a Domain Name System (herein "DNS") translation technique within a virtual computing network, the implementation of console proxy servers, and the use of image stripes to communicate display updates during customer viewing sessions to a device.

The DNS server translation technique facilitates the on-demand launch and termination of console proxy virtual machines to manage physical resources while supporting customer viewing sessions.

In one embodiment, console proxy servers establish a viewing session and receive virtual machine display changes. An image stripe contains a number of image tiles, which are changed portions of a virtual machine display combined into a single image. Image stripes also include mapping information to facilitate application of the contained tiles at their corresponding locations. The image stripe is then communicated to the customer device. The customer device extracts the image tiles and associated location information from the image stripes. Then the customer device applies and displays the tiles as to create an updated view of the virtual machine display.

The use of image stripes reduces the volume of network traffic requests and enables console proxy viewing session traffic to traverse firewalls with allowed network protocols such as HTTP. The DNS server and console proxy virtual machines also enhance the scalability of virtual machine environments, and provide a manageable and scalable number of viewing sessions while reducing associated network traffic with image stripe display updates.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 1A-1C provide one embodiment of a collective conceptual framework for a scalable cloud infrastructure.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments of the present invention(s), examples of which are illustrated in the accompanying figures. It is noted that wherever practicable similar or like reference numbers may be used in the figures and may indicate similar or like functionality.

FIG. 1A shows three separate data centers 105, each housing a number of servers S. A server S is a computer system based upon any type of hardware, including for example low-cost commodity data center hardware: x86 servers connected together using gigabit Ethernet. Service providers and enterprises have traditionally relied upon large local installations of this type of commodity data center hardware, including computing, storage, and networking devices, to provide information technology services and applications to their customers. Currently there is a large inventory of unused data center hardware in the market.

Figure 1B:
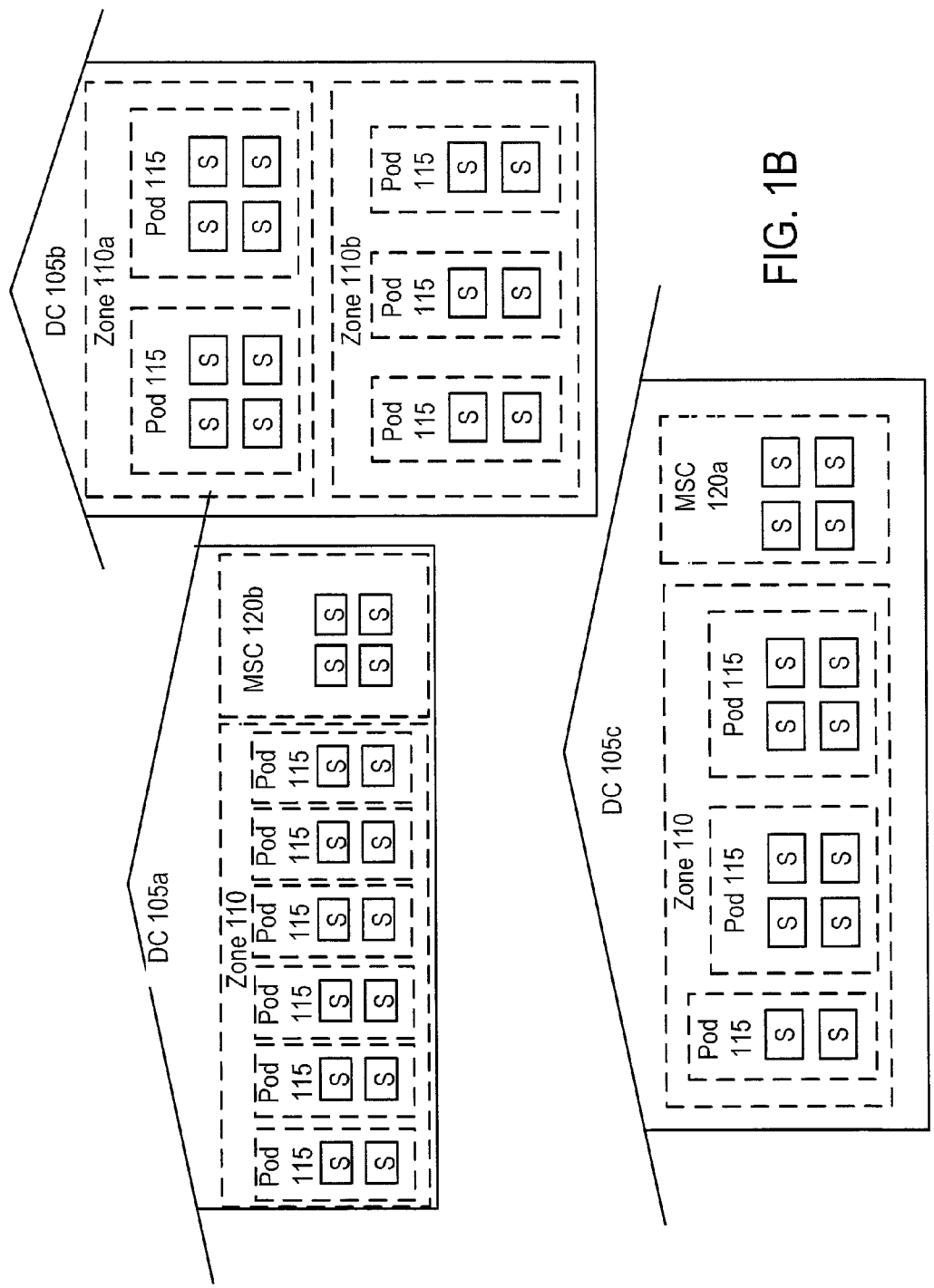
Figure 1C:
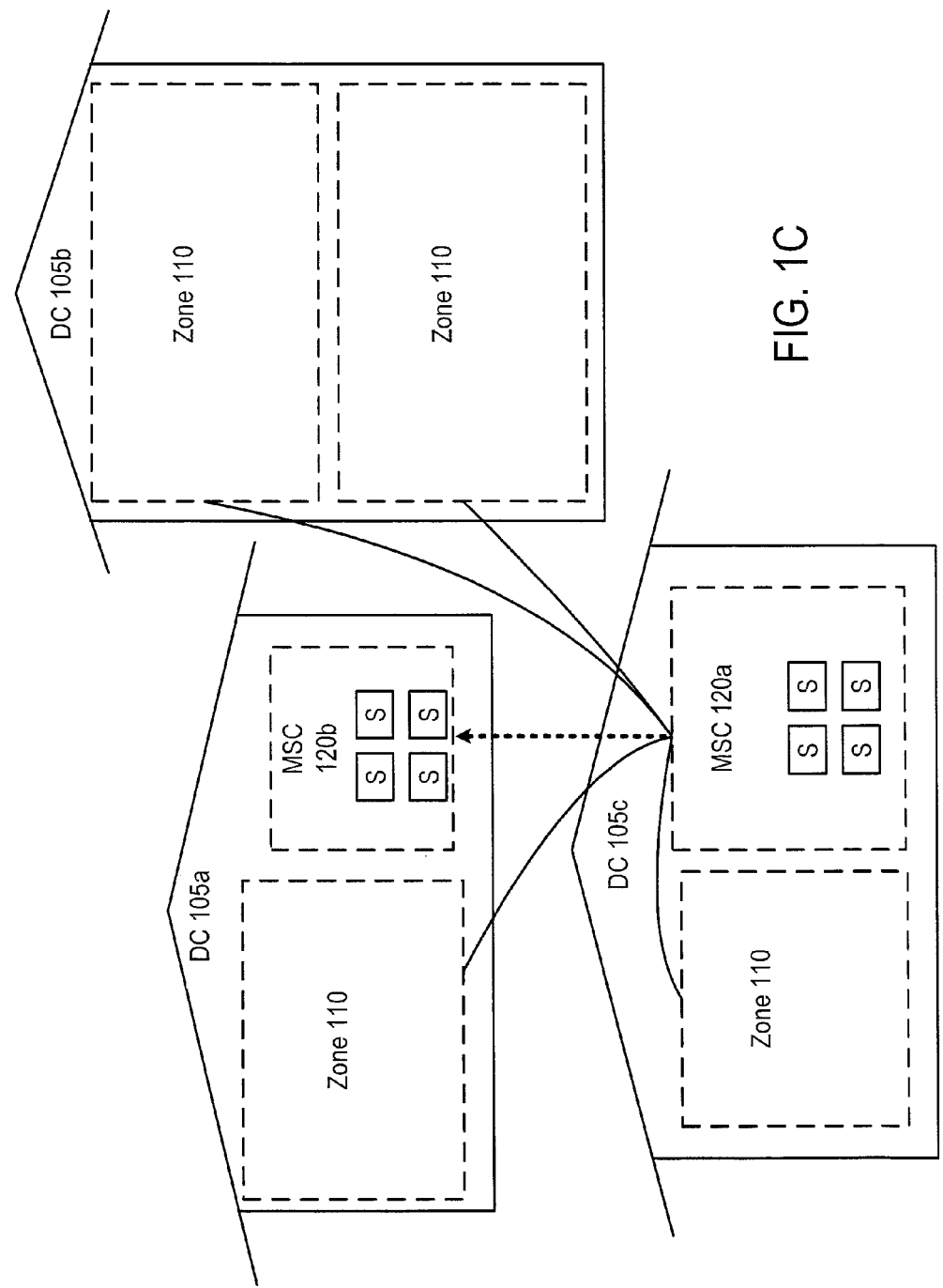

The present invention improves the organization and utilization of data center hardware to provide a scalable cloud infrastructure, by building a system of small blocks within data centers, and connecting the physical servers across data centers using high speed networks. FIGS. 1B-1C illustrate the overall framework for the scalable cloud infrastructure.

FIG. 1B shows several data centers ("DC") 105 and servers S partitioned into groupings of zones 110, pods 115 and management server clusters (MSC) 120. Each zone 110 is physically isolated from each other zone 110. Typically each data center 105 includes only one zone 110, however, a data center 105 can include multiple zones 110, e.g., as shown in data center 105*b*. When two zones such as 110*a*, 110*b* are not geographically distributed, they may still be physically isolated, e.g., via use of a separate power supplies, network uplinks, and other supporting infrastructure. Each zone 110 includes a grouping of pods 115.

Each pod 115 is a self-contained, physical grouping of servers that acts as a management unit for the scalable cloud infrastructure. Each pod 115 includes a discrete (i.e., non-overlapping) set of the physical resources in the zone 110. The physical resources in each pod have strong connectivity with each other and weak connectivity with the physical resources outside the pod. The strong connectivity and weak connectivity refer to the latency for traffic between connected physical resources. The latency for traffic may be determined by many different factors.

In one embodiment, strong connectivity and weak connectivity may be switching of traffic between any two connected physical resources on a particular layer of a standard, for instance the OSI model. As an example, strong connectivity may imply Layer-2 switching. Similarly, weak connectivity may imply layer-3 or higher layer switching. In another embodiment, strong connectivity and weak connectivity may be based on the bandwidth available for traffic between the connected physical resources. As an example, strong connectivity may be implemented by provisioning a minimum of 10 GHz links between the connected physical resources. Similarly, weak connectivity may be implemented by a minimum of 1 GHz links between the connected physical resources. Additionally, geographic proximity may also be used to define strong connectivity and weak connectivity. It is possible that geographically distant physical resources have a higher latency for traffic than geographically closer physical resources.

The discrete set of physical resources in a pod 115 may be based on the anticipated processor, memory, network, and storage requirements of potential customers of resources within a zone 110. For example, a customer's storage and network requirements can be significant. Given a specification of resources, e.g., an average and peak throughput in terms of input-output operations per second (IOPS), and assuming that that throughput is to be divided equally amongst the devices (e.g., virtual machines) in a pod 115, then the IOPS capacity of the servers determines an overall total number of virtual machines for a pod 115. If each server within the pod 115 can host a specified number of virtual machines, then a pod 115 could be sized accordingly in terms of the number of servers, storage, and networking requirements.

The pods 115 can be coupled with any number of other pods 115 using Layer-3 switching, thereby enabling unlimited scaling of the number of customers using the scalable cloud infrastructure. The pods 115 allow the scalable cloud infrastructure to be built from smaller units of management, and without a large up-front hardware investment.

FIG. 1B also shows one or more management server clusters (MSC) 120 to the data centers 105 housing the zones 110. The management server cluster 120 is a cluster of front-end servers S and their associated backend storage. The servers that make up the management server cluster 120 allocate and manage use of the physical resources in the associated zones 110 by one or more customer accounts associated with units of virtual resources as shown in FIG. 1C and further described below. A virtual machine is characterized by a combination of the units of virtual resources for processor, memory, storage and networking. In brief, units of virtual resources are established by apportioning selected physical resources within the pods 115 and zones 110; the physical resources may be shared between units of virtual resources (i.e., may overlap).

Typically the management server cluster 120 is deployed as a primary management server cluster 120*a* in a first datacenter 105*a*, with a back up management server cluster 120*b* installation at a second datacenter 105*c*.

In one embodiment, data stored by the first management cluster 120*a* is replicated and transmitted for storage by the second management cluster 120*b*. In response to a failure of the first management cluster 120*a*, the domain name system (DNS) records are updated in the servers in the zones 110 such that network traffic that would normally be directed to the first management server cluster 120*a* instead is directed to the second management server cluster 120*b*. Thus, operation of the servers in the zones 110 is unaffected by failure of the first management server cluster 120*a*. The two management server clusters 120 are isolated from one another by residing in different data centers 105*a*, 105*c* to minimize the likelihood of simultaneous failure of the management server clusters 120.

It is within the architectural framework of FIGS. 1B-1C that the scalable cloud infrastructure is further described herein.

Figure 2:
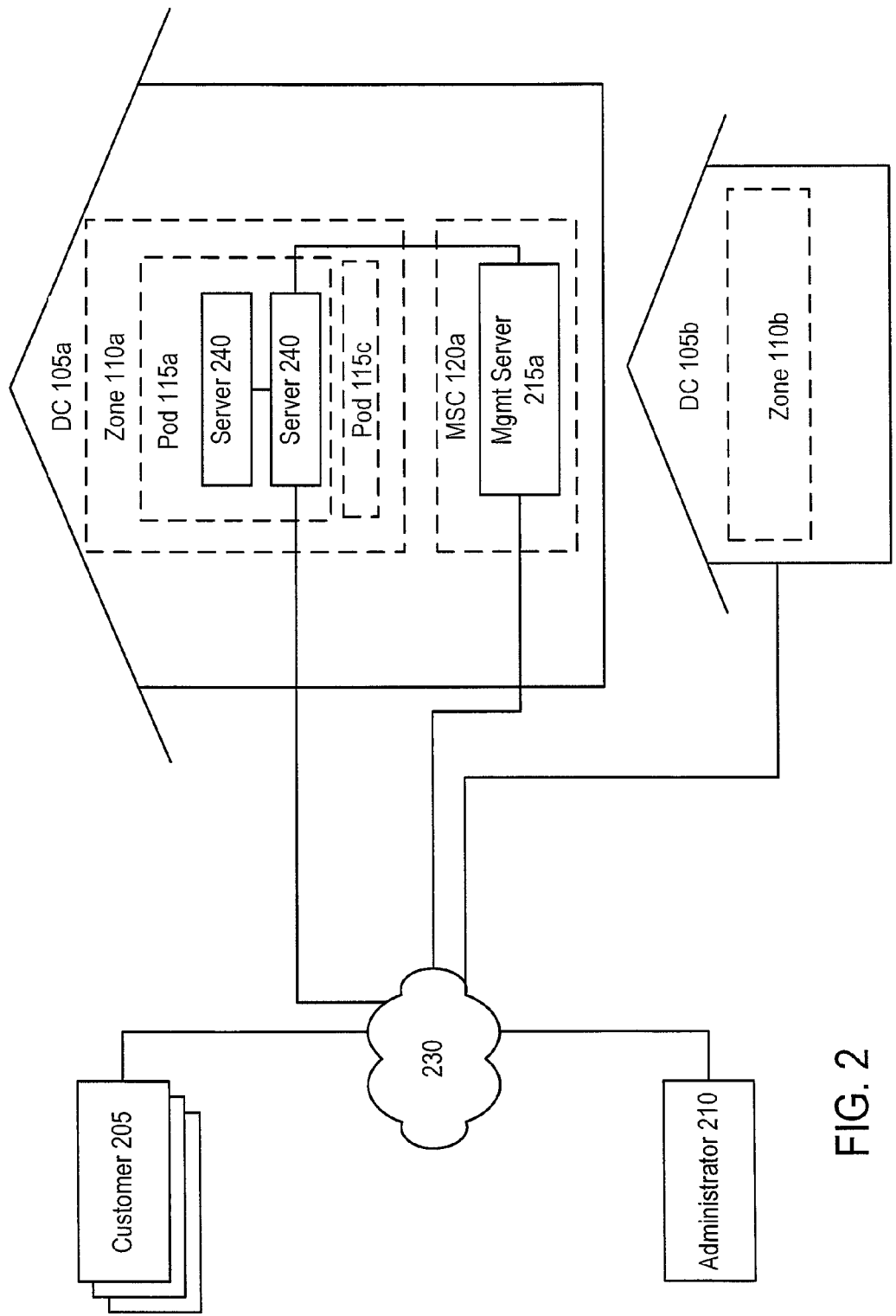
FIG. 2 is one embodiment of a high-level entity diagram for a scalable cloud infrastructure.

FIG. 2 is a high-level entity diagram for one embodiment of a scalable cloud infrastructure. The entities included are one or more customers 205, an administrator 210, one or more management server clusters 120 and servers 240, which are physical resources within zones 110 in data centers 105, connected to a network 230. The data center 105 are partitioned into a plurality of zones 110, and each zone contains one or more pods 115, as described above. Each zone 110 is connected to a management server 215 in the management server cluster 120 and to the network 230. The network 230 is the Internet according to one embodiment, but may be any other network, including but not limited to any combination of a LAN, a WAN, a MAN, a mobile, a wired or wireless network, a private network, or a virtual private network, where Layer 2 and Layer 3 switching is required.

The administrator 210, or operator of the cloud infrastructure, deploys the various resources as discussed above. In one embodiment, the operator of the cloud infrastructure is distinct from one or more providers of the resources, e.g., a provider may own any number of virtual machines that will be used by the administrator 210 in the cloud infrastructure. In one embodiment, the provider owns a large number of servers 240.

One or more customers 205 are users of portions of the resources of the cloud infrastructure. The term customer may refer to either the device or the user (entity or person). Customers 205 access the resources associated with their respective customer accounts and are connected to the resources via the network 230. Details of customer 205 account resource allocation and access to those resources are discussed further in conjunction with FIGS. 8 and 9.

The management server cluster 120 is a cluster of management servers 215 and their associated database 220. As indicated in conjunction with FIG. 1C, the management server cluster 120 serves multiple zones 110 and pods 115 within data centers 105. The management server cluster 120 also maintains customer account information. For example, the management server cluster 120 may establish virtual machines, units of virtual resources, by apportioning the physical resources within the pods to each of the units. The physical resources may be shared between two or more of the virtual machines. Although one management server cluster 120 is depicted, multiple management server clusters 120 may be distributed throughout the cloud infrastructure, each serving a plurality of data centers 105 and zones 110. The details of the management server cluster 120 are described further in conjunction with FIG. 6.

Each management server 215 allocates and manages use of the physical resources within one or more zones 110. For example, management server 215*a* manages the resources in zone 110*a*, management server 215*b* manages the resources in zone 110*b*, and management server 215*c* manages the resources in zone 110*c*. A management network may connect each of the management servers 215 to a zone 110, and may also connect the physical resources within the pod 115. A management server 215 can allocate to, and manage, units of virtual resources associating customer accounts with the physical resources in a zone 110 associated with that management server 215. The details of the management server 215 are described further in conjunction with FIG. 7. The database 220 can be any database commonly used for storage. According to one embodiment, the database 220 is a MySQL database.

The data centers 105, zones 110, and pods 115 were described briefly in conjunction with FIG. 1B-1C. Switching within the zones 110 typically is Layer 3 switching, while switching within the pods 115 typically is Layer 2 switching, providing unlimited scaling of the cloud infrastructure. Zones 110 are described in greater detail in conjunction with FIG. 3, pods 115 are described in greater detail in conjunction with FIG. 4, and the servers in each pod 115 are described further in conjunction with FIG. 5

Figure 3:
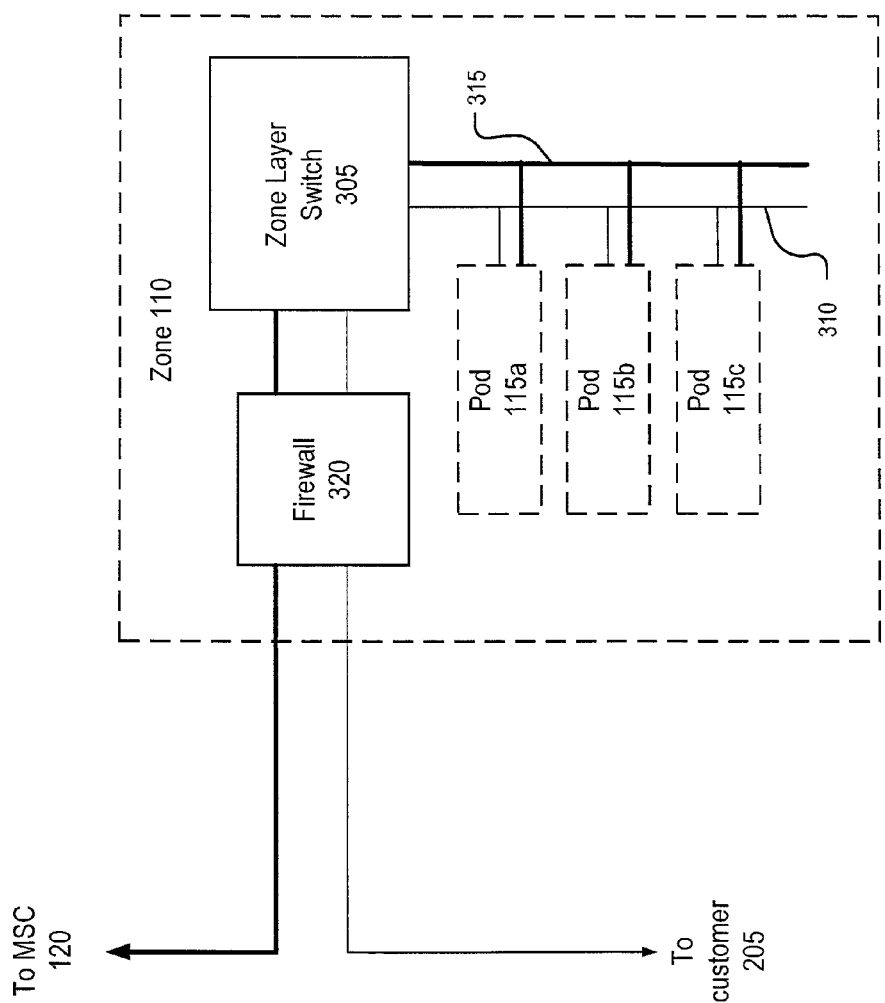
FIG. 3 depicts one embodiment of a zone 110.

FIG. 3 depicts one embodiment of a zone 110. As discussed above, a zone 110 is a grouping of physical devices, including a grouping of pods 115, that is physically isolated from other zones 110. Devices within a zone 110 utilize a one or more power supplies and/or network uplink(s) that are dedicated solely to the zone 110. The zone 110 includes a zone layer switch 305 that process traffic in and out of the zone 110 over a data network 310 and a management network 315. The zone 110 is separated from other devices on the network 230 by a firewall 320.

The zone layer switch 305 manages the network traffic to and from the pods 115 within the zone 110 and comprises one or more Layer 3 ("L3") (i.e., network layer) switches. For a zone 110 comprising the servers in a small data center 105, a pair of L3 switches may suffice. For large data centers, high-end core switches may implement core routing capabilities and include line cards that support firewall capabilities. A router redundancy protocol like VRRP also may be deployed. Traffic within the zone 110 (and/or pods 115) also is switched at other levels of either the OSI model or other networking models, as described further below.

One embodiment of the zone layer switch 305 supports two internal networks within the zone 110: a data network 310 and a management network 315. The data network 310 is used to carry traffic to and from the zone 110 from customers 205 and other entities on the network 230. For example, operation of virtual machines implemented on the servers within the pods 115 of the zone 110, e.g., if a virtual machine within the zone 110 issues an HTTP request over the network 230, both the HTTP request and any associated HTTP response will be routed via the data network 310.

The management network 315 is used to carry traffic to and from the zone 110 from the management server cluster 120 (and individual management servers 215 within the management server cluster 120), as well as traffic generated internally within the zone 110. Each pod 115 in the zone 110 is communicatively coupled to both the data network 310 and the management network 315.

All traffic in and out of the zone 110 passes through a firewall 320. The firewall 320 may comprise one or more network firewalls specific to each internal network 310, 315. The firewall 320 provides connection to the public network space (i.e., network 230) and is configured in routing mode.

In one embodiment, the firewall 320 operates in a transparent mode for the data network 310 such that the data network 310 comprises the same IP address space as the public Internet. For example, if the data network 310 utilizes public IP addresses, the zone 110 is assigned a unique set of IP addresses that do not overlap with the IP addresses assigned to other zones 110.

In one embodiment, the firewall 320 operates in a network address translation (NAT) mode for the management network 315. For example, the zone 110 can be assigned an IP address in the 192.168.0.0/16 Class B private address space, and each pod 115 within the zone 110 can be assigned an IP address in the 192.168.*.0/24 Class C private address space; the firewall 320 remaps between the two address spaces as data is sent to or from the pods 115 within the zone 110. Hence, it is possible for the pods 115 of different zones 110 to have overlapping or identical private IP addresses. In some embodiments, the firewall 320 is outside of the zone 110 such that it filters traffic to both the zone 110 and the management server cluster 120. In some embodiments, the firewall 320 enables site-to-site VPN such that servers in different zones 110 can reach each other within a virtual private network.

Figure 4:
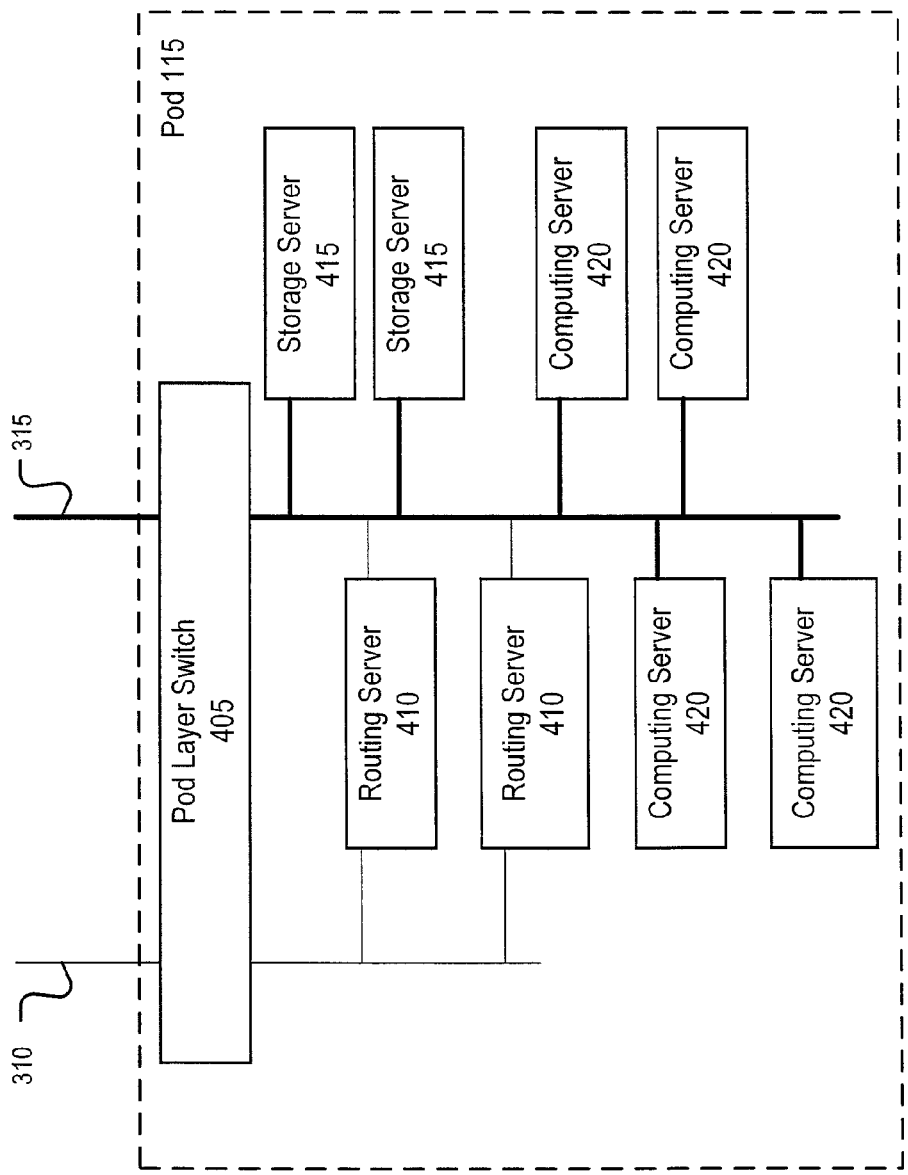
FIG. 4 illustrates one embodiment of a pod 115.

FIG. 4 illustrates one embodiment of a pod 115. The pod 115, as described above comprises a discrete set of the plurality of physical resources in the zone 110. The servers in a pod 115 typically comprise one or more each of routing servers 410, storage servers 415, and computing servers 420. In one embodiment, distinct routing servers 410 and computing servers 420 are used, whereas in another embodiment (not shown), they are one and the same and provide both functionalities described below. Traffic on the management network 310 and data network 315 in and out of the pod 115 is switched by one or more pod layer switches 405. The servers in a pod, both individually and collectively are implemented by one or more computer systems.

The routing servers 410 are configured primarily to provide networking for computer data by the inclusion of suitable networking hardware (network interfaces, networking ports, and the like). The routing servers 410 can be implemented using any manner of suitable networking hardware and software, and in some instances are combined with computing servers 420.

The storage servers 415 are implemented as any device or combination of devices capable of persistently storing data in non-transitory computer-readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here. In addition, the storage servers 415 support local or distributed databases for storing customer information; in one embodiment the database are MySQL databases.

Typically single uniform storage servers do not scale to more than a few dozen servers. A system architecture using pods 115, however, allows multiple smaller storage servers 415 to be associated with each pod 115. Pod-level shared storage delivers the benefit of shared storage such as the ability to restart virtual machines on a server different than where the virtual machine last ran, which provides the ability to start up, shut down, and reallocate available servers.

The computing servers 420 host the virtual machines within the pod 115 as will be discussed further in conjunction with FIG. 5. The computing servers 420 may comprise computing, routing, and/or storage servers having different processing, memory, storage, and networking capabilities according to various embodiments, and may perform all of the functions of routing servers 410 in embodiments that exclude separate routing servers 410. Additionally, the computing servers 420 can utilize different data storage systems, such as direct-attached storage (DAS), network-attached storage (NAS), or a storage area network (SAN).

The pod layer switch 405 switches network traffic into and out of the pod 115. The pod layer switch 405 may comprise one or more pod layer switches. The pod layer switch 405 typically is a Layer 2 switch, but switching is also possible at other levels of either the OSI model or other networking models. In alternate embodiments, the pod 115 may implement internal networks in addition to or distinct from the data network 310 and the management network 315.

In one embodiment, a public switch may be used for public traffic (e.g. traffic on the data network 310) and a private switch for management traffic (e.g. traffic on the management network 315). Storage traffic (e.g., traffic between the computing servers 420 and the storage servers 415 via the private switch) may be isolated from other traffic to avoid packet loss and delays that are common with regular TCP/IP traffic, and to protect the servers 240 from potentially malicious Internet traffic. In addition, the storage traffic may be directed over a higher speed switch to meet the higher performance demands of the storage system.

In one embodiment of the pod 115, the pod layer switch(es) 405 are duplicated for redundancy, with each computing server 420 connected to multiple switches. Further, it should be noted that multiple layers of switches can be coupled to effectively form a pod layer switch 405 with an increased number of ports.

In another embodiment of the pod 115 design, Virtual LANs (VLANs) are used to segment traffic while using a single pod layer switch 405. The pod layer switch 405 may support quality of service guarantees for virtual machines within the pod; the storage VLAN is then given the appropriate share of the available bandwidth on the switch to meet the IOPS requirements of such virtual machines.

The VLANs for the management, public and storage traffic may be created before the pod is deployed into production, by programming the pod layer switch 405 using the usual management interfaces. The storage server 415 is also configured to use the storage and management VLANs using the usual management interfaces of the storage server 415. In other embodiments, more than one traffic type can be directed over a single switch while other traffic types can have their own separate switches. For example, guest traffic, which refers of traffic between the virtual machines of each customer, may be segmented using VLANs and directed on the same switch as management traffic.

Figure 5:
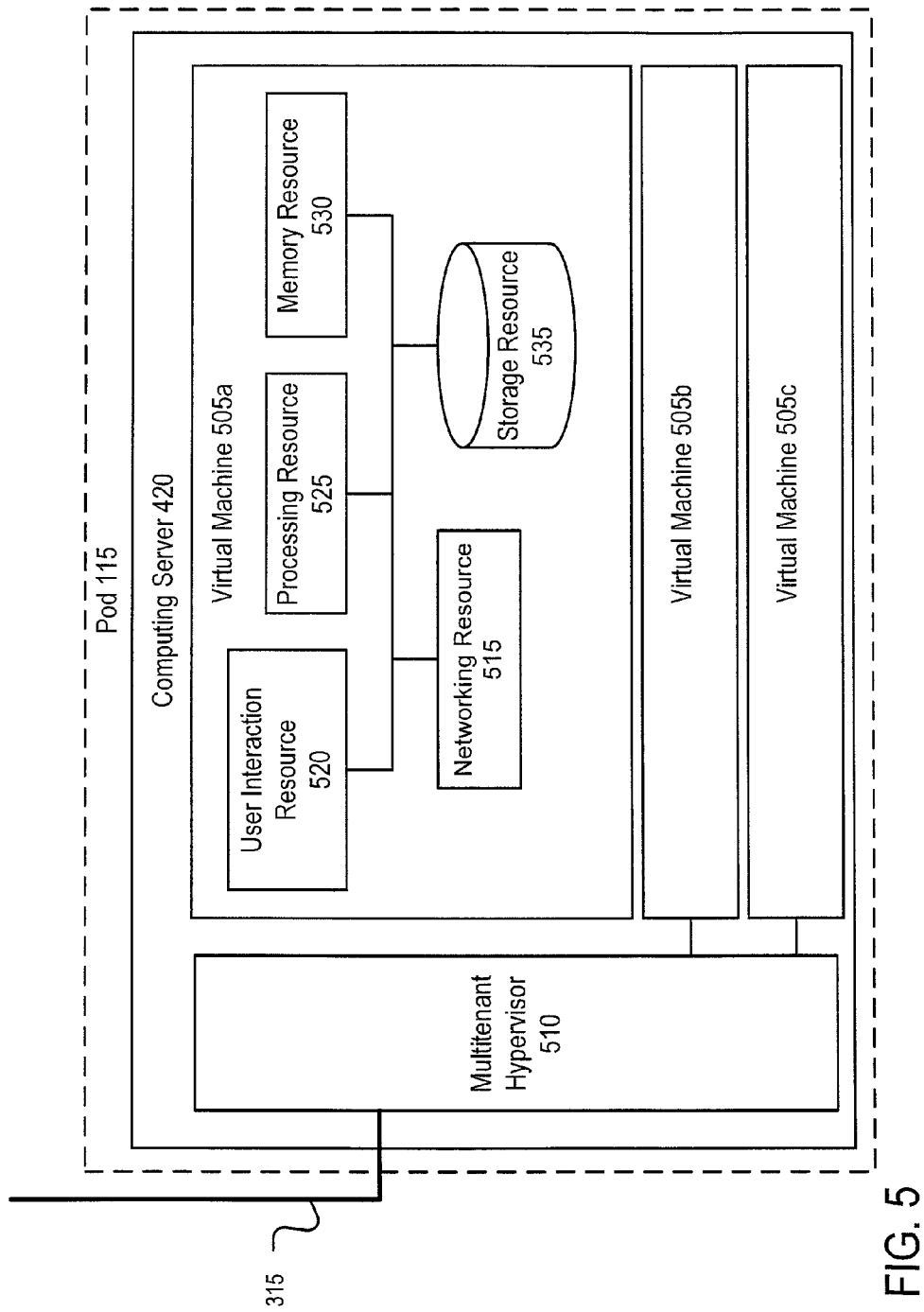
FIG. 5 depicts one embodiment of a computing server 420.

FIG. 5 depicts one embodiment of a computing server 420. The computing server 420 hosts one or more virtual machines 505 and a multitenant hypervisor 510. The computing server 420 is communicatively coupled to at least the management network 315, and may also be coupled to the data network 310 in embodiments without separate routing servers 410. In other embodiments, the virtual machines 505 and the multitenant hypervisor 510 each are individually coupled to the management network 315.

In one embodiment, the multitenant hypervisor 510 is implemented on the computing server 420 as a set of computer-executable instructions encoded onto a non-transitory computer-readable storage medium included in the computing server 420 and executed by a processor included in the computing server 420. The multitenant hypervisor 510 therefore can comprise, for example, a software layer that manages the physical computing elements (e.g., processors, memory, network cards and interfaces, data storage disks) of the computing server 420. The virtual machines 505 access and use these physical computing elements as dictated by the multitenant hypervisor 510. The multitenant hypervisor 510 can alter the allocation and accessibility of computing elements within the computing server 420 over time in response to changes in the number and configurations of hosted virtual machines 505. The changes in the number and configurations of hosted virtual machines 505 may occur, for example, because the customers 205 associated with the hosted virtual machines 505 made such a request or changes have occurred at other virtual machines 505 associated with the customer 205.

A number of virtual machines 505 may run on the computing server 420. The virtual machine 505 comprises an allocation of the computer hardware and computer software elements of the computing server 420. The virtual machine 505 simulates a physical computing device and can be configured to perform any computing task via inclusion of appropriate computer hardware and/or computer software elements therein. For example, a virtual machine 505 can simulate a physical computing device having a 1 GHz processor, 1 GB of memory, and a 16 GB hard drive.

A virtual machine 505 is associated exclusively with a single customer 205. However, a computing server 420 may host a set of virtual machines 505, each associated with different customers 205. For example, in FIG. 5, one customer 205 may be associated with virtual machine 505a, where as another customer may be associated with virtual machine 505b and 505c.

A single computing server 420 simultaneously can host virtual machines 505 associated with different customers 205, but the multitenant hypervisor 510, along with the associated management server 215, manages the hosted virtual machines 505 such that each virtual machine 505 appears to the corresponding customer 205 as a physically distinct and self-contained computing device.

In one embodiment, the virtual machine 505 comprises a processing resource 525, a memory resource 530, a storage resource 535, a networking resource 515, and a user interaction resource 520. The resources 515-535 of the virtual machine 505 comprise allocations of the computer hardware and/or computer software elements of the computing server 420, according to the units of virtual resources designated for a given customer account. The processing resource 525 comprises an allocation portion of one or more computer processors. The memory resource 530 and the storage resource 535 can comprise an allocation of any physical device or combination of physical devices capable of persistently storing computer data, such as a hard disk drive, random-access memory (RAM), a writable compact disk (CD) or DVD, a solid-state memory device, or other optical/magnetic storage mediums. Other types of non-transitory computer readable storage mediums can be used for the memory resource 530 and/or the storage resource 535, and it is expected that as new storage mediums are developed in the future, they can be configured in accordance with the teachings here. In one embodiment, the memory resource 530 provides operational memory and comprises a specified amount of RAM. The storage resource 535 provides long-term data storage and, again, can comprise any suitable type of non-transitory computer readable storage medium such as one or more hard disk drives.

The networking resource 515 comprises an allocation of computer networking hardware and software elements to enable the virtual machine 505 to communicate with other networked entities over the management network 315. One or more IP addresses can be associated with the virtual machine 505 and supported by the networking resource 515. Accordingly, the networking resource 515 can include any type of communication interface suitable for transmitting and receiving data over the network 315. For example, the networking resource 515 can comprise an Internet interface, a serial interface, a parallel interface, a USB (Universal Serial Bus) interface, an Ethernet interface, a T1 interface, a Bluetooth interface, IEEE 802.11 interface, IEEE 802.16 interface, or any other type of wired or wireless communication interface.

The user interaction resource 530 comprises hardware and software elements to enable the customer 205 or administrator 210 to interact with the virtual machine 505. For example, the user interaction resource 520 can provide display elements, such as a graphical user interface (GUI) whereby either the customer 205 or administrator 210 can interact with and manage operation of the virtual machine 505. The user interaction resource 530 can also support a keyboard, and mouse, or the like to further enable the customer 205 or administrator 210 to manage operation of the virtual machine 505.

In some embodiments, the resources 515-535 of the virtual machine 505 are supported within a single computing device, such as a server. In other embodiments, portions of the virtual machine 505 can be distributed among any number of physically separate computing devices that are communicatively coupled via the network 315. For example, the storage resource 535 can comprise multiple hard-drives residing on multiple servers. Because the resources 515-535 are communicatively coupled to one another, the virtual machine 505 appears to the customer 205 to be a single computing device that includes the cumulative capabilities of the resources 515-535 regardless of the actual physical location or distribution of any computer hardware or software elements associated with of the resources 515-535.

In some embodiments, there is a specially designated virtual machine called the management domain that provides a standard set of commands to control the multitenant hypervisor 510, for example, to start and stop virtual machines, and to control the networking stack of the multitenant hypervisor 510. In other embodiments, the multitenant hypervisor 510 is hosted by a host operating system and the virtual machines operate as processes of the operating system with the multitenant hypervisor 510 providing isolation. The multitenant hypervisor 510 ensures that the virtual machines share the physical resources of the compute host such as the processor, memory, network interfaces and storage. In some cases, the multitenant hypervisor 510 defers the operation and management of the network stack and storage interfaces to the management domain or host operating system.

The physical network interfaces are shared among the virtual machines by the multitenant hypervisor 510. In one embodiment, the virtual machines get the illusion of possessing a standard physical network interface such as those provided by commercially available network interface cards. The multitenant hypervisor 510 ensures that these virtual interfaces are connected to the underlying physical network interfaces of the compute host.

The cloud infrastructure comprises a management server 215 interacting with agents that in turn interact with and control the multitenant hypervisor 510 using its standard set of commands. In one embodiment there may be one agent running in each operating system or management domain on a server 240. In other embodiments one agent may interact with a group of servers 240 whose multitenant hypervisors have been clustered using cluster management software. The agents are controlled by the management server 215.

The management server 215 also interacts with the storage servers 415 in order to create and destroy the virtual disks for the virtual machines. In one embodiment, a special version of the agent known as the storage agent runs on the processor subsystem of the storage server 415 to perform these activities. In another embodiment, the management server 215 uses the standard set of commands provided by the management server 215, or its Application Programming Interface (API) to create and destroy virtual disks.

The storage server 415 presents virtual disks to the computing server 420. In one embodiment, the virtual disks are visible as networked file systems to the multitenant hypervisor 510. In another embodiment the virtual disks are presented as block devices to the multitenant hypervisor 510. The multitenant hypervisor 510 ensures that these virtual disks are presented to the virtual machine while giving the illusion of locally attached storage to the virtual machines.

The multitenant hypervisor 510 provides a standard set of commands that the agent uses. Some examples of the command set are: start a virtual machine, stop a virtual machine, reboot a virtual machine, add or remove a virtual disk for a virtual machine, add or remove a virtual network interface for a virtual machine, mount/dismount a virtual disk from the storage server 415, add or remove VLANs from the physical network interfaces of the server 240.

The agents collect information from the computing servers 420 and storage servers 415 and report to the management server 215. The management server 215 maintains the reported information in database tables. The database includes for example: the state of the multitenant hypervisor 510, the state of the virtual machines, the configuration of the networking stack, such as configured VLANS (explained subsequently in the description of FIG. 8), IP addresses, speeds and aggregations of the physical network interfaces, storage resources visible from the compute server 420, the capabilities of the multitenant hypervisor 510, the capabilities of the storage server 415, the capacity, used and allocated size of the storage server 415, statistics such as network traffic consumed by the virtual machine, processor and memory usage of virtual machine.

The management server commands the agent to perform certain actions in response to actions by the cloud customer or cloud operator at the user interface or API. For example, when a customer starts a virtual machine, the management server 215 may look up its table of servers 240 and identify a server 240 that has enough spare capacity to satisfy the requested processing, memory and network resources for the virtual machine. The management server 215 may also look up its table of virtual machines to verify if the virtual machine is already running or if its virtual disks already exist on a storage server 415. If the virtual machine is not already running or its virtual disks do not exist, the management server 215 may command the storage server 415 or storage agent to create the disks.

The management agent then sends a start virtual machine instruction to the agent for the compute host chosen in step 1. In the start instruction are included information such as: the portion of the physical processors to allocate to the virtual machine, the virtual network interfaces to create for the virtual machine and their mapping to the physical interfaces and identification of the virtual disks to present to the virtual machine.

The agent may then instructs the multitenant hypervisor 510 on the computing server 240 (or computing server 420 in the example of FIG. 5) to mount the virtual disks from the storage server 415, create the virtual network interfaces and start the virtual machine with the desired processors, memory, network interfaces and disk. The agent verifies that the virtual machine has started using the hypervisor command set and reports the success to the management server 215. The management server 215 updates its table of virtual machines with information about the virtual machine including the server 240 it is running on.

The management network 315 handles traffic associated with the multitenant hypervisor 510 executed by the computing servers 420 within the pods 115 of the zone 110. Hence, traffic on the management network 315 may additionally comprise messages between a multitenant hypervisor 510 and a virtual machine 505 (e.g., messages related to the allocation of the physical computing elements of the particular computing server 420 to a particular virtual machine 505).

In an embodiment of the invention, network and storage isolation may comprise isolation of data alone and not quality of service. In other embodiments, the quality of service capabilities built into the multitenant hypervisor's 510 as well as network and storage hardware may be used to support enhanced isolation.

Network bandwidth throttling is used to limit the rate of traffic from each virtual machine. The operator of the cloud infrastructure may configure the management server 215 with the desired maximum network bandwidth for each virtual machine. The configuration can be done on a per-service-offering basis, a per-customer account basis or across the cloud. A management server 215 includes this maximum in the start instructions sent down to the multitenant hypervisor 510 when starting a virtual machine. The multitenant hypervisor 510 uses a standard set of commands to limit the guest traffic from the new virtual machine.

Storage bandwidth throttling is used to limit the rate of storage traffic from each virtual machine while reading or writing to a virtual disk. The operator of the cloud infrastructure may configure the management server 215 with the desired maximum IOPs bandwidth for each virtual machine. As before, the configuration can be done on a per-service-offering basis, a per-consumer basis or across the cloud. The management server includes this maximum in the start instructions send down to the multitenant hypervisor 510 when starting a virtual machine. The multitenant hypervisor 510 uses a standard set of commands to limit the storage traffic from the new virtual machine to a maximum number of IOPS as defined by the operator of the cloud infrastructure.

Figure 6:
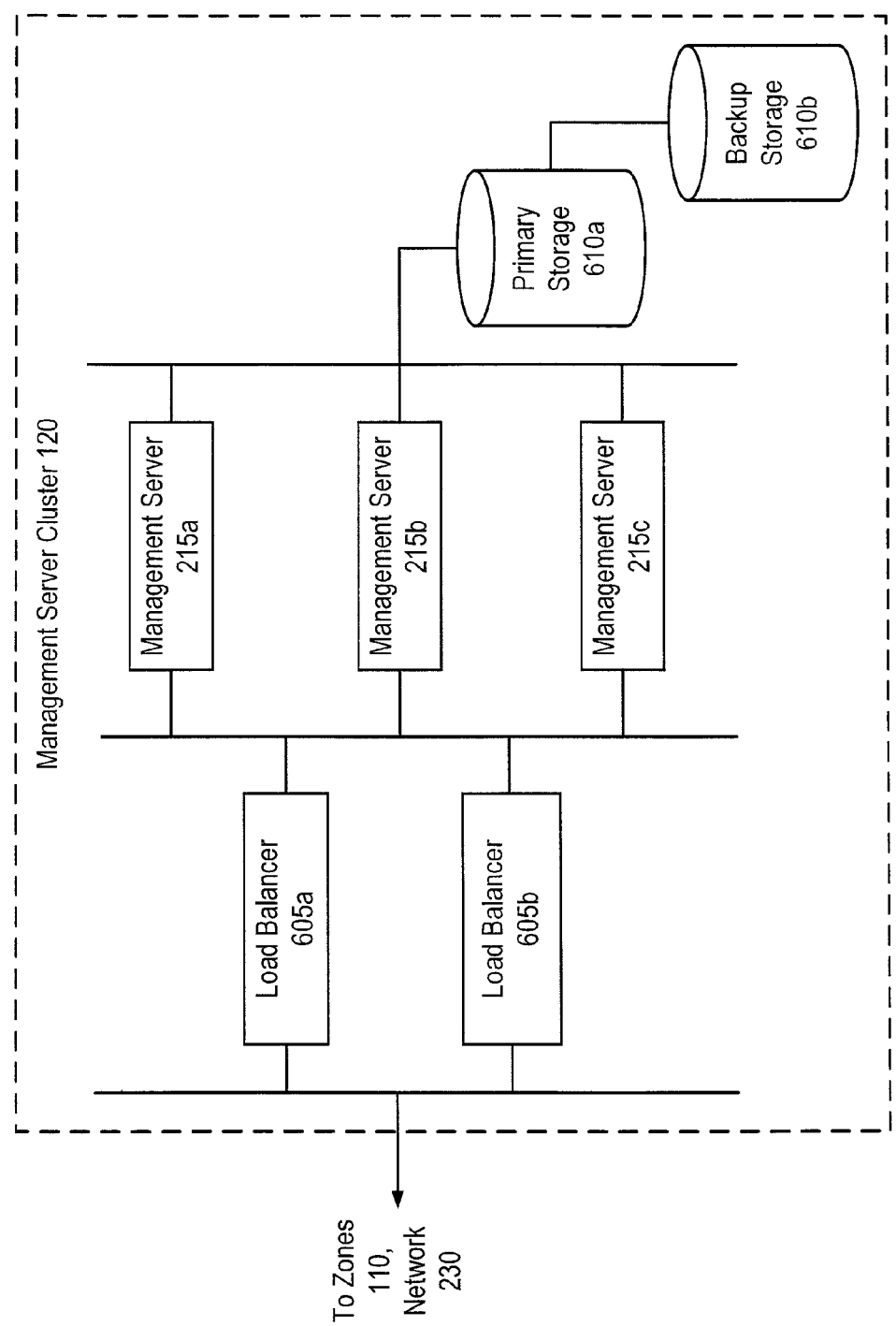
FIG. 6 shows one embodiment of a management server cluster 120.

FIG. 6 shows one embodiment of a management server cluster 120. As noted above, the management server cluster 120 is a cluster of front-end servers and their associated backend storage. The servers 215 that make up the management server cluster 120 allocate and manage use of the physical resources in the associated zones 110 by one or more customer accounts associated with units of virtual resources.

The depicted management server cluster 120 comprises three management servers 215, two load balancers 205, primary storage 610a, and backup storage 610b. Other embodiments of a management server cluster 120 may comprise different numbers of management servers 215 and load balancers 605.

The management servers 215 are communicatively coupled to the load balancers 605, and the load balancers 605 are communicatively coupled to the networks 310, 315. Thus, the management servers 215 can transmit and receive data and commands via the networks 310, 315 through the load balancers 605. The load balancers 605 distribute traffic from the networks 310, 315 and associated workload among the management servers 215 to optimize utilization of the management servers 215. In some embodiments, the load balancers 605 comprise dedicated hardware devices (e.g., multi-layer hardware switching devices or severs configured to provide load balancing functionality). In other embodiments, the load balancers 605 comprise load balancing software installed on the management servers 215.

The primary storage 610a and the backup storage 610b can be implemented as any device or combination of devices capable of persistently storing data in non-transitory computer-readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here. In one embodiment, the primary storage 610a and the backup storage 610b further comprise MySQL databases. The primary storage 610a and backup storage 610b can also comprise one or more dedicated storage servers. The primary storage 610a for the management server cluster 120 is communicatively coupled to the management servers 215 and provides data storage as required by the management servers 215. The backup storage 610b is communicatively coupled to the primary storage 610a and comprises a replicated version of the data stored by the primary storage 610a. The devices in the management server cluster 120 may be Layer 2 switched.

Figure 7:
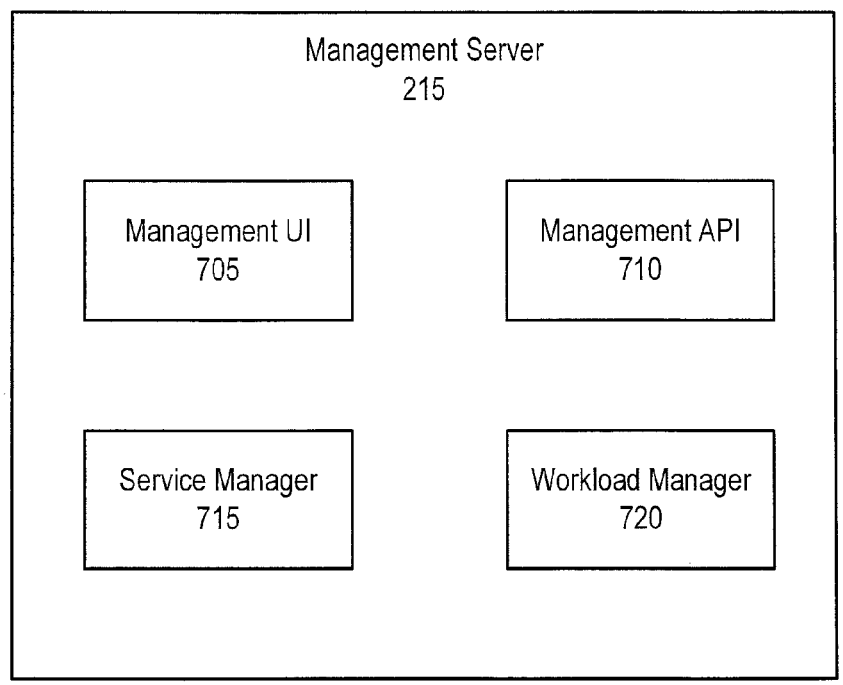
FIG. 7 is a block diagram illustrating one embodiment of a management server 215 architecture.

FIG. 7 is a block diagram illustrating one embodiment of a management server 215 architecture. The operations of the management server 215 as described herein can be controlled through either hardware (e.g., dedicated computing devices or daughter-boards in general purpose computers), or through computer programs installed in computer storage of the management server 215 and executed by one or more processors of the management server 215 to perform the functions described herein. One of skill in the art of system engineering will readily determine from the functional and algorithmic descriptions herein the construction and operation of such computer programs.

In one embodiment, the management server 215 comprises a management user interface (UI) 705, a management application programming interface (API) 710, a service manager 715, and a workload manager 720.

In one embodiment, the management UI 705 provides the primary user interface for customers 205 and administrators 210. The management UI 705 can provide a graphical user interface (GUI) that is accessible over the networks 310, 315 via a conventional web browser using any networked computing device. A customer can, for example, input specifications for configuring a new virtual machine 505 using a web GUI provided by the management UI 705. More particularly, a customer configures a virtual machine by specifying the amount of processor, storage, memory and networking resources, in appropriate units (e.g., processor speed for processors, amount in mega- or giga-bytes for storage and memory, and throughput for networking).

A customer can also interact with a configured virtual machine 505 using a web GUI provided by the management UI 705 by, for example, inputting data for processing by the virtual machine 505, viewing outputs computed by the virtual machine 505, and inputting commands related to a complete or partial shutdown of the virtual machine 505. The management UI 705 can provide a different web GUI for a customer 205 than for an administrator 210.

One embodiment of the management API 710 allows an administrator 210 (or a customer 205 with appropriate access credentials) to further oversee virtual machine 505. For example, the management API 710 can enable customization of the primary user interface provided by the management UI 705. The management API 710 can also allow customization of billing policies and procedures, as well as access policies (e.g., granting different levels of access to a virtual machine 505 based on credentials associated with a customer 205).

The service manager 715 communicates with computing servers 420 to oversee the creation, operation, and shutdown of virtual machines 505. For example, the service manager 715 can receive specifications for a virtual machine 505 from the management UI 705, select a computing server 420 suitable for hosting the virtual machine 505, and transmit commands to the selected computing server 420 that case the computing server 420 to implement the virtual machine 505. Once the virtual machine 505 is configured and implemented on the computing server 420, the service manager 715 can monitor its operation and implement corresponding billing and access policies, e.g., via routing appliance 805 discussed further in FIG. 8. For example, the service manager 715 can bill a customer $20 per hour of operation for a virtual machine 505 with processing equivalent to a 1 GHz processor, memory equivalent to 1 GB of RAM, and storage equivalent to a 250 GB hard drive, as well as $0.10 per GB of network traffic associated with the networking resource of the virtual machine 505.

The workload manager 720 interacts with the multitenant hypervisors 510 installed on the computing servers 420. The workload manager 720 monitors the status (e.g., availability and workload) of the different physical computing elements included in the computing servers 720. The workload manager 720 can also oversee the transfer of a virtual machine 505 from a first computing server 420 to a second computing server 420 upon failure of the first computing server 420 or an imbalance of workload between computing servers 420.

Figure 8A:
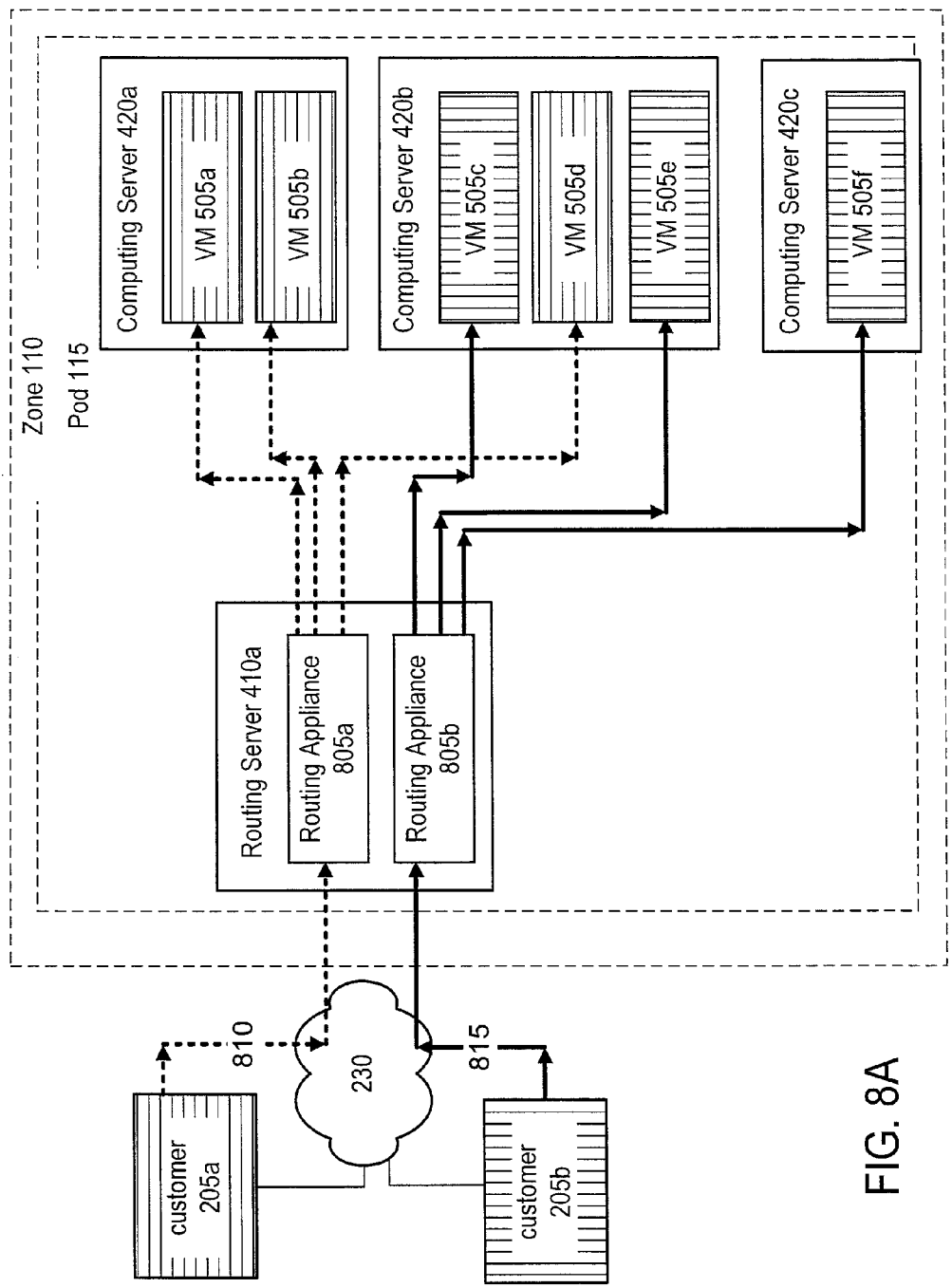
FIG. 8A is a conceptual diagram showing one embodiment of an overlay of the virtual machines on the physical devices.

FIG. 8A is a block diagram showing one embodiment of an overlay of the virtual machines allocated to two customers 205a, 205b on the physical devices, e.g., virtual machines 505a-505f. As shown, virtual resources such as virtual machines 505, are allocated to customer accounts associated with customers 205a and 205b. In this example, virtual machines 505a, 505b, and 505d are allocated to customer 205a and virtual machines 505c, 505e, and 505f are allocated to customer 205b. The virtual resources correspond to physical resources within various computing servers 420 within a pod 115 and zone 110. Note that some of the physical resources are shared, at least in part, by customers 205a, 205b. For example, computing server 420b is shared by both customers 205a, 205b.

In a cloud infrastructure serving multiple customers, the administrator 210 may ensure that accesses are secure and protected against attacks from malicious customers, by allocating resources on demand for instance. Routing appliances 805 run as virtual machines in the system to provide functionalities such as routing, DNS, load balancing, console access, etc. When they are no longer needed, they are garbage collected to release any precious system resources that they are holding. The routing appliances 805 may be hosted by the routing server 410.

The eth0 interface of a routing appliance 805 serves as the gateway for the guest virtual network and has the IP address of 10.1.1.1, which is configurable. The eth1 interface of the routing appliance 805 resides on the management network 315 and is used to configure the routing appliance. The eth2 interface is assigned a public IP address on the data network 310.

As indicated in FIG. 8A, VMs associated with customers 205a and 205b are segmented on the same physical network. In order for the VMs associated with a customer 205 to access the internet or to accept connections from the internet (such as ssh), a routing appliance may be started up for the VM. In the example of FIG. 8A, customer 205a accesses virtual machines VM 505a, 505b and 505d through routing appliance 805a hosted on computing server 420a, while customer 205b accesses virtual machines VM 505c, 505e and 505f through routing appliance 805b. While physical resources such as network and physical server are shared, the networks of customers 205 are segmented and cannot see each other.

When a customer 205 starts a VM in a certain zone 110, a management server 215 determines if a routing appliance 805 for that customer 205 is already running within that zone 110. If it is not, the routing appliance 805 is started prior to the actual start of the VM. As the VM starts, the routing appliance 805 may then provide network functionalities such as DHCP, DNS, routing, load balancing, and firewall protection to the VM. After the last VM associated with customer 205 is stopped, the management server garbage 215 may garbage collect the routing appliances 805 after a defined interval. One routing appliance 805 may be needed per customer account per zone 110.

In one embodiment, each customer 205 is assigned a guest virtual network in each zone 110. A guest virtual network may be configured to any private address space, for example the Class A network in 10.0.0.0/8 private address space. The guest virtual network is an overlay network on top of the management network 315 and is managed by the multitenant hypervisor 510.

A guest virtual network may be valid within one zone 110. Therefore virtual machines in different zones 110 cannot communicate with each other using their IP addresses in the guest virtual network. Virtual machines in different zones 110 communicate with each other by routing through a public IP address.

A routing appliance 805 is associated with each guest virtual network. The routing appliance 805 automatically assigns an IP address for each virtual machine associated with the customer 205, for example, in the 10.0.0.0/8 network. The customer 205 may manually reconfigure virtual machines to assume different IP addresses as long as the customer 205 does not introduce IP address conflicts.

Source NAT is automatically configured in the routing appliance 805 to forward out-bound traffic for all virtual machines associated with the customer 205. The customer 205 may configure port forwarding rules to direct inbound public traffic to the virtual machines associated with the customer 205. A management server 215 programs the routing appliance 805 and the firewall 320 according to the port forwarding rules specified by the customer 205. A customer 205 may also configure a software load balancer running on the routing appliance 805 to dispatch inbound traffic to multiple virtual machines associated with the customer 205 according to customer-specified load balancing rules.

The cloud infrastructure can support multiple guest virtual networks per customer 205. The concept of routing appliances 805 as virtual machines may be generalized to include virtual machines with multiple virtual NIC interfaces and connected to multiple guest virtual networks. The virtual NIC interfaces are discussed further in conjunction with FIG. 8B.

As shown in FIG. 8A, although some of the physical resources are shared by the customers 205a, 205b, traffic between the two customers 205a, 205b and their virtual machines 505 is segmented using two separate routing appliances 805, as are the individual virtual machines 505 assigned to each customer 205.

The customer 205 can provide a functional specification for the virtual machine 505 (i.e., that the virtual machine 505 be capable of performing one or more specified computing tasks while meeting specified performance criteria) or the customer 205 can provide a resource specification for the virtual machine 505 (i.e., that the virtual machine 505 include specified computing resources such as hardware and/or software elements). The virtual machine 505 can also be configured according to any number of default specifications. Once the virtual machine 505 is configured, the customer 205 can access the virtual machine 505 over the network 230 and thereby interact with the virtual machine 505 to accomplish tasks as desired. For example, the customer 205 can utilize remote access software such as secure shell and/or virtual displays to control the virtual machine 505.

Figure 8B:
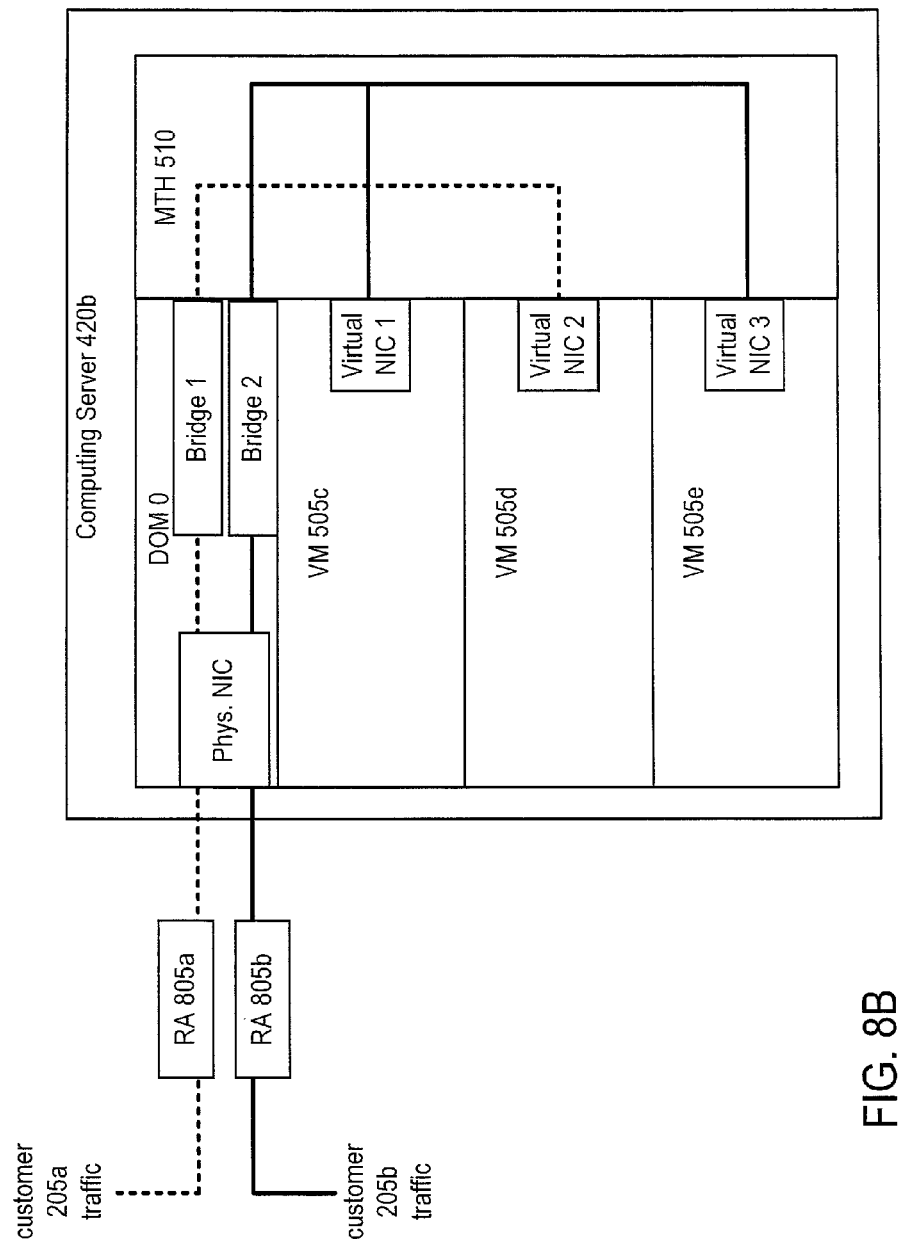
FIG. 8B shows additional detail for one embodiment of traffic routed between the different virtual machines 505c-505e within computing server 420b, when the traffic is to/from two different customers 205a, 205b.

FIG. 8B shows additional detail for one embodiment of traffic routed between the different virtual machines 505c-505e within computing server 420b, when the traffic is to/from two different customers 205a, 205b. Traffic from customer 205a goes through routing appliance 805a, when it meets the physical NIC of domain zero ("DOM 0") associated with the corresponding virtual machine (505d), it goes through a separate bridge (1) reserved only for traffic from customer 205a before being routed to Virtual NIC2 for virtual machine 505d. In some embodiments of the invention, the domain zero is also the multitenant hypervisor 510.

The agent running on the computing server 420, on behalf of the management server 215 ordering the instantiation, sets up a number of virtual networking components that co-operate to achieve communication between the virtualized operating system and the hardware. The virtual NIC is an emulated network adapter that shuttles traffic back and forth between dom0 and VM 505. The bridge is a virtual switch that shuttles traffic back and forth between two segments—in this case, the network adapter of the customer virtual machine and VLAN network adapter. The bridge may also comprise a VNIC in some embodiments. The VNIC is a pseudo-network adapter that tags and untags frames in the communication using a standard, for example the 802.1q trunking standard.

Similarly, traffic from customer 205b goes through routing device 805b, and when it meets the physical NIC of DOM 0, it goes instead through a separate bridge (2) for customer 205b traffic, before reaching virtual NIC1 or virtual NIC3 of virtual machines 505c and 505e, respectively. Note that even though customer 205b has two virtual machines (505c, 505e) within the computing server 420b, it has only one bridge (2), as only one is needed for each customer 205b. Doing so allows traffic for the same customer (205b) to be seen, but not traffic to/from other customers (e.g., 205a) on the same computing server 420b.

The cloud infrastructure combines physical host-based network virtualization and physical network/VLAN-based network virtualization. Each customer's virtual machine gets the illusion of participating in a physically distinct local area network, with the customer's other virtual machines. It is possible for example that both customer A's private network and customer B's private network is in the IP address space 10.1.1.0/24 but they never see each other's packets. It is possible that the networks addresses are not shared as well.

A prospective customer 205x may contact the administrator 210, requesting resources from the cloud infrastructure. The administrator 210 registers a customer account in the name of customer 205x. A management server 215 reserves and assigns a unique VLAN ID Vx, for example within the 802.1q VLAN range (12-bit number totaling 4000 possible unique IDs) to the customer. If no unused VLAN IDs are found, the customer 205x is informed that it is not possible to start a virtual machine.

In some embodiments, this ID is stored in a database that the management server 215 uses. The customer 205x now starts a virtual machine within the cloud infrastructure and the management server 215 orders the instantiation of a virtual machine within one of the computing servers 420.

Vy is then transmitted to the agent running on the computing server 420 in question, as part of the virtual machine instantiation procedure. The agent uses Vy to set up a tagged VLAN interface that will shuffle the correct traffic back and forth between the network and the virtual machine. In some embodiments, this setup communication happens through the management network 315. The management network 315 shares the same physical network but is effectively segmented from other customers because it has a different (or no) tag.]

Traffic coming out of the virtual machines set up in this fashion will be tagged with the VLAN number as the packet travels through the multitenant hypervisor 510; traffic coming into that interface tagged with Vy will be unwrapped from the tagged frame and delivered to the appropriate virtual machine based on the MAC address.

When a virtual machine associated with a customer actually starts on a particularly server 240, the virtual NIC required to provide multi-tenancy is created on the server 240 and associated with the virtual machine to provide segmented network access. When the user VM is stopped, the virtual NIC is destroyed (i.e. garbage collected) and its resources returned to the server 240.

In the embodiment of FIG. 8B, for VM 505c and VM 505e, there's only one virtual NIC and bridge created because they belong to the same customer and the virtual machines are allowed to see each other's traffic. This makes the virtual NIC garbage collection more difficult as the agent cannot terminate the bridge until all virtual machines for that customer are stopped on that server 240. Each bridge and virtual NIC created requires resources on the server 240 in terms of memory. The agent may create and garbage collect bridges and virtual NICs as needed.

Figure 9:
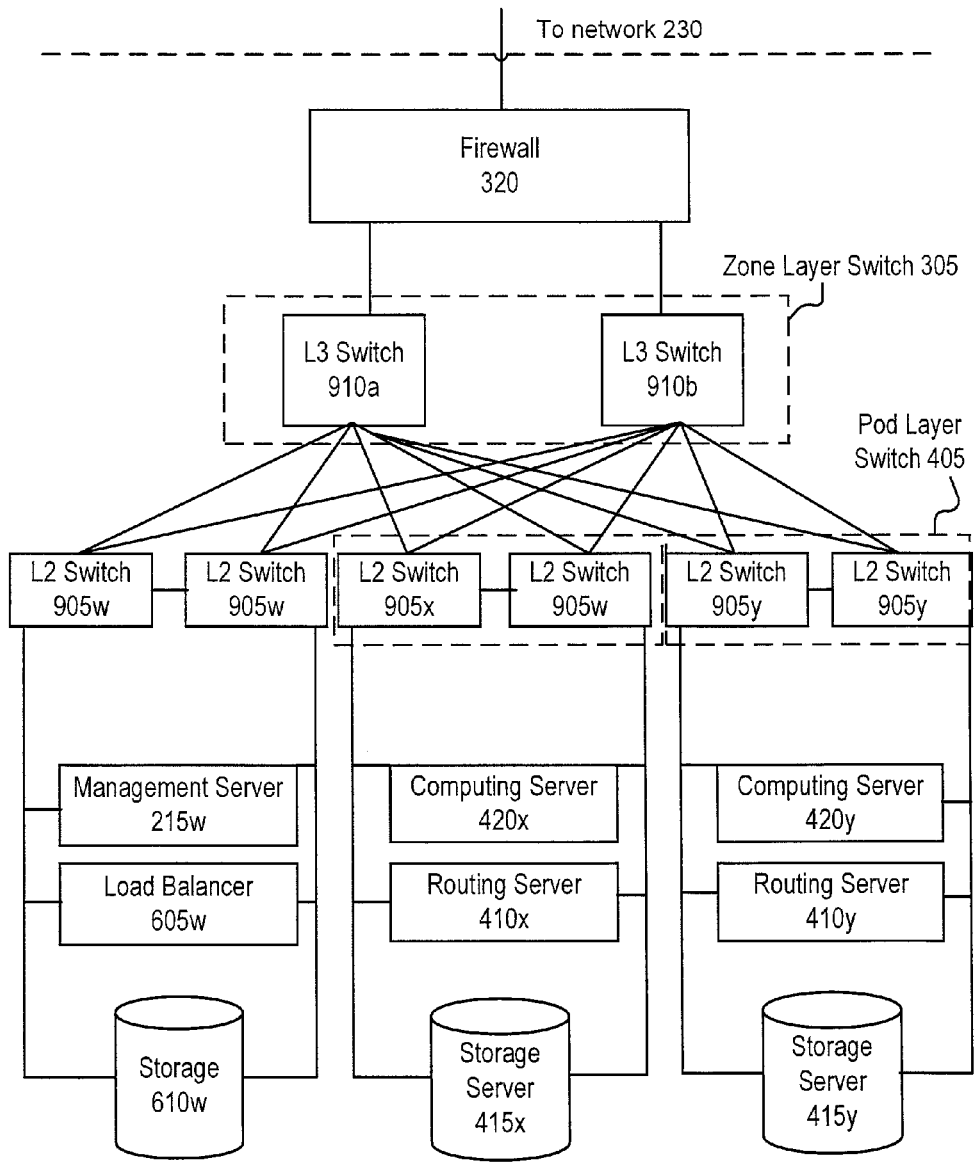
FIG. 9 illustrates switching at different layers in the network architecture of the scalable cloud infrastructure in accordance with one embodiment.

FIG. 9 illustrates switching in the network architecture of the scalable cloud infrastructure, in accordance with one embodiment. For the sake of illustration, two pods each with one computing server 420, one routing server 410 and one storage server and an MSC 120 with one management server 215, one load balancer 605 and one storage 610 are displayed. The firewall 320 provides connection to the network 230 and is configured in routing mode. The firewall 320 forwards HTTP requests and API calls from the network 230 to a management server 215. The public traffic, which may be routed on a VLAN, also passes through the firewall 320 en-route to the zone layer switch 305. Additionally, in some embodiments, the firewalls 320 may route traffic on internal networks between pods 115. In certain embodiments, the firewall 320 enables site-to-site VPN such that servers 240 and management servers 215 in different zones 110 can reach each other.

In the embodiment of FIG. 9, the zone level switch 305 comprises two layer-3 switches L3 switches 910. Additionally, redundant pairs of layer-2 switches L2 switches 905 are deployed in the pod layer switches 405. In large deployments of pods 115 that include multiple racks, a second level of pod layer switch 405 may be deployed.

Console Proxy System Architecture

Figure 10:
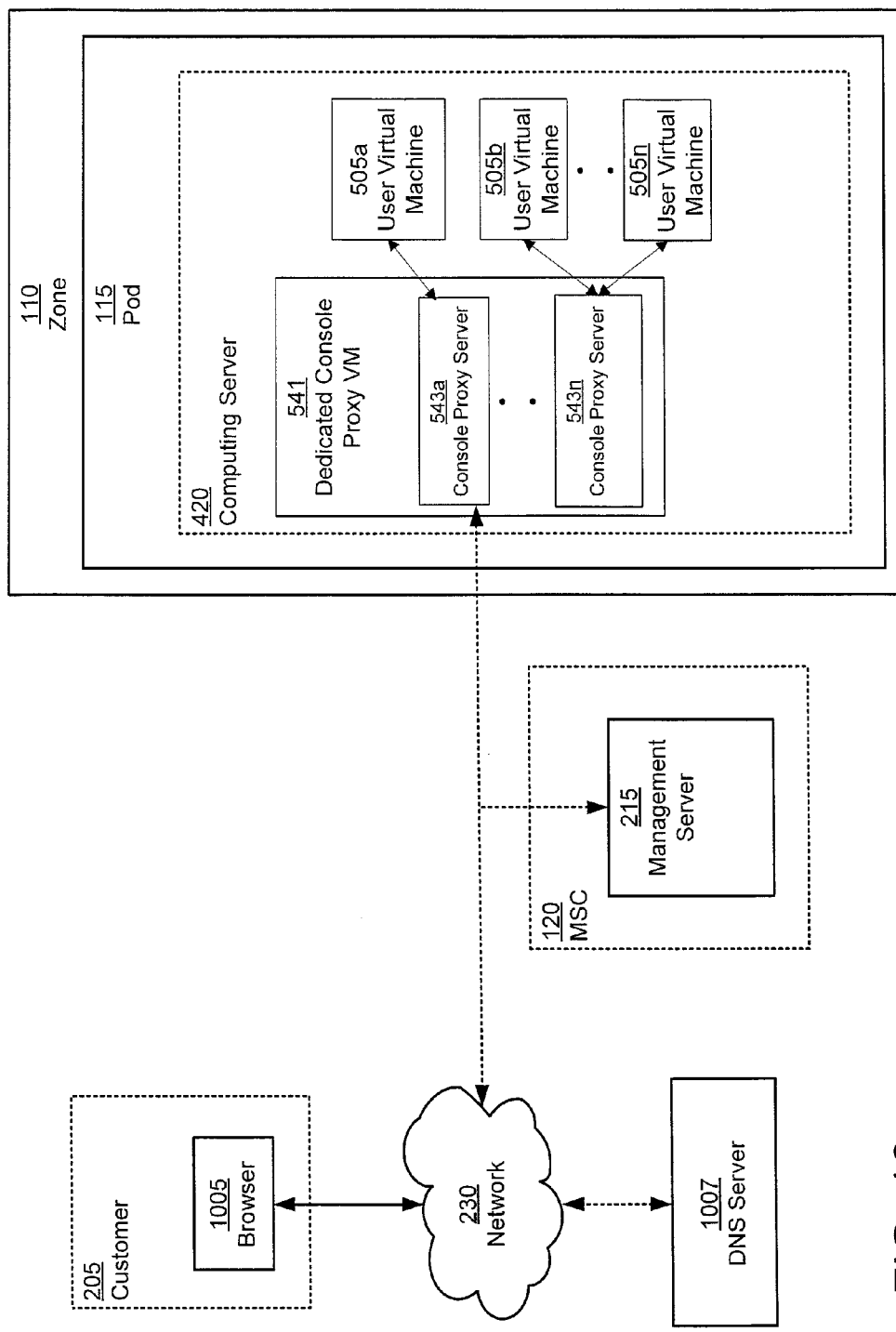
FIG. 10 illustrates one embodiment of a console proxy virtual machine within a zone.

FIG. 10 is a block diagram of a pod architecture showing the use of console proxy servers 543. As shown, the customer 205 device runs a browser application 1105, the management server 215 includes a domain name system ("DNS") server 1007 within its routing appliance 805, and the pod 115 includes a dedicated console proxy virtual machine 541 and a number of console proxy servers 543.

Browser 1005 is an application running on customer 205 device, such as a web browser on a computer or mobile device capable of facilitating the communication of data, images, and/or user input over network 230. Although only one customer 205 is shown for clarity of description, multiple customers 205 may be included in the architecture as described elsewhere herein. Referring to the illustrated embodiments herein, browser 1005 can be applications such as INTERNET EXPLORER, OPERA, SAFARI or FIREFOX, or other applications supporting HTTP over TCP/IP, JAVA, HTML and Asynchronous JavaScript and XML (herein "AJAX"). In other embodiments, specifically considering limited computing devices such as handhelds, certain communications may be restricted on customer 205 device or limited in order to facilitate proper operation. For example, browser 1005 may still receive HTTP display update information even when communication of customer 205 input is limited. Browser 1005 may communicate with management server 215, DNS server 1007, and pod 115 within zone 110 over network 230 according to various methods well known in the art, which may include protocols such as TCP/IP, FTP, HTTP, DNS, IMAP, UDP or any other protocol capable of communicating data over a network.

DNS server 1007 is wild-card capable and configured to translate viewing session connection requests into actual domain system names for console proxy virtual machines 541 and servers 543. Browser 1005 uses the translated domain system names to connect to assigned console proxy servers. The translation method is described in further detail with FIG. 11.

Management server 215 manages console proxy virtual machines 541 in a similar method to that of any other virtual machine (e.g., 505) allocated to a pod 115. As described above, management server 215 creates, terminates, and migrates virtual machines 505 as needed within and across pods 115. A number of dedicated console proxy virtual machines 541 along with a number of virtual machines 505 are running on computing server 420. While only console proxy virtual machines 541 and virtual machines 505 are discussed herein, any type of virtual machine may reside on a computing server 420.

One or more console proxy servers 543 reside within dedicated console proxy virtual machine 541. Each console proxy server 543 may host a number of virtual machines 505 for secure viewing sessions. Browser 1005 connects to one or more virtual machines 505 associated with the customer 205 through one or more console proxy servers 543. In one embodiment, customers 205 requesting access to a virtual machine 505 are assigned a console proxy server 543 to host their traffic. In other embodiments, security protocols, such as SSL or TLS, provide secure HTTP ("HTTPS") connections for multiple customers 205 on one console proxy server instance 543n. In one embodiment, browser 1005 communicates with management server 215 and DNS server 1007 to view virtual machine 505a through console proxy server 543a. In some embodiments, all virtual machines 505 assigned to console proxy virtual machine 541 also are assigned a console proxy server 543 residing on the console proxy virtual machine 541. Alternatively, the console proxy virtual machine 541 and console proxy servers 543 are assigned only when browser 1005 accesses a virtual machine 505.

Figure 11:
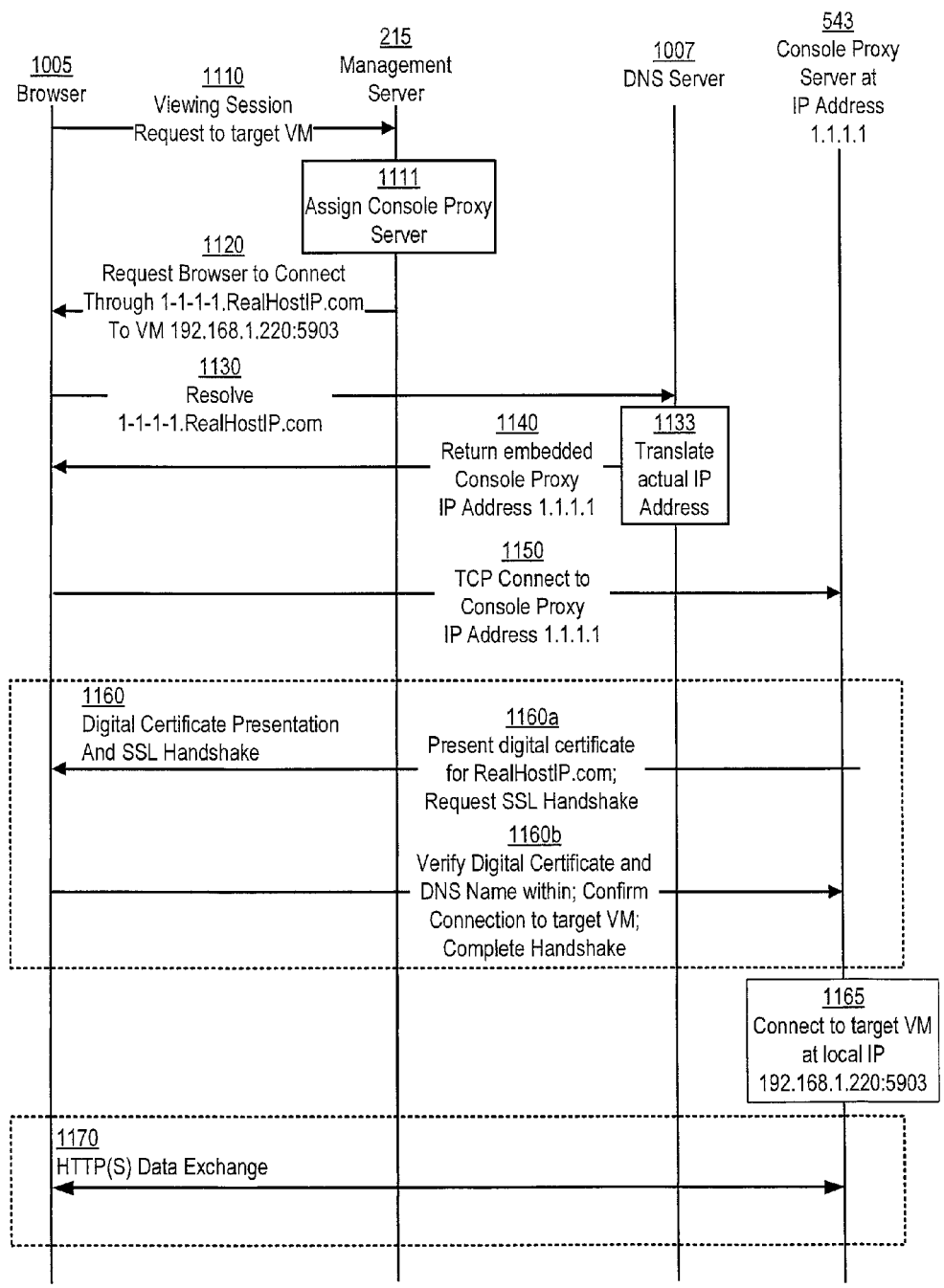
FIG. 11 is an interaction diagram depicting one embodiment of connecting to a console proxy server with a browser.

FIG. 11 is an interaction diagram that illustrates one embodiment of establishing a connection between a browser 1005 and a console proxy server 543. Browser 1005 requests access to a target virtual machine instance 505n and initiates 1110 a viewing session request via management server 215. In response to the request, management server 215 assigns 1111 the requested virtual machine instance 505n to a console proxy server 543. Assignment process 1111 includes verification of customer 205 or administrator 210 credentials to determine whether the requested virtual machine 505 is available for access. Additional detail regarding assignment process 1111 is discussed below in conjunction with FIGS. 12A-B.

In the example presented herein, DNS server 1007 operates the dynamic RealHostIP.com domain for illustrative purposes only. In response to assignment 1111 of a console proxy server 543, management server 215 requests 1120 browser 1005 to connect through RealHostIP DNS server 1007. Connection request 1120 includes the corresponding name-IP address of the allocated console proxy server 543. In others, proxy server name-IPs correspond directly to the actual IP addresses of console proxy servers 543 and are decoded at RealHostIP DNS server 1007. In the illustrated embodiment, RealHostIP DNS server 1007 translates 1133 imbedded name-IP addresses to actual console proxy server IP addresses. While a direct translation between the actual proxy IP address and name-IP is presented herein, one skilled in the art will recognize that methods of encoding and decoding such as hash tables and encryption keys are equally applicable. In one embodiment of the direct translation method, console proxy server 543 has assigned IP address 1.1.1.1 and the requested virtual machine instance 505n (not shown) has local IP address 192.168.1.220:5903, management server 215 requests that the browser 1005 connect through a URL, say 1-1-1-1.RealHostIP.com to 192.168.1.220:5903. In response to browser request 1130, the RealHostIP DNS Server 1007 returns 1140 the corresponding actual proxy IP address, 1.1.1.1, to browser 1005. Responsive to receiving 1140 the proxy IP address, browser 1005 initiates 1150 a TCP connection to the assigned console proxy server 543a at IP address 1.1.1.1.

Following initiation of TCP connection 1150, browser 1005, and assigned proxy server 543 participate in handshaking process 1160. The handshaking process comprises the presentation 1160a of the RealHostIP.com digital certificate to browser 1005, verification of the certificate at browser 1005 and confirmation 1160b of connection to console proxy server 543 (target VM at local IP address 192.168.1.220: 5903) to complete the handshake. A successful handshake results in a SSL or TLS connection facilitating HTTPS data exchange 1170 between browser 1005 and assigned console proxy server 543.

Responsive to completing handshake 1160, console proxy server 543 connects 1165 to the requested virtual machine 505. In one embodiment, management server 215 provides console proxy server 543 with virtual machine 505 local IP addresses. Alternatively, management server 215 may indicate a customer 205 virtual network, or number of, including a number of virtual machines 505 available for viewing. In other instances, console proxy server 543 may already host connection 1165 to the requested virtual machine 505.

Figure 12A:
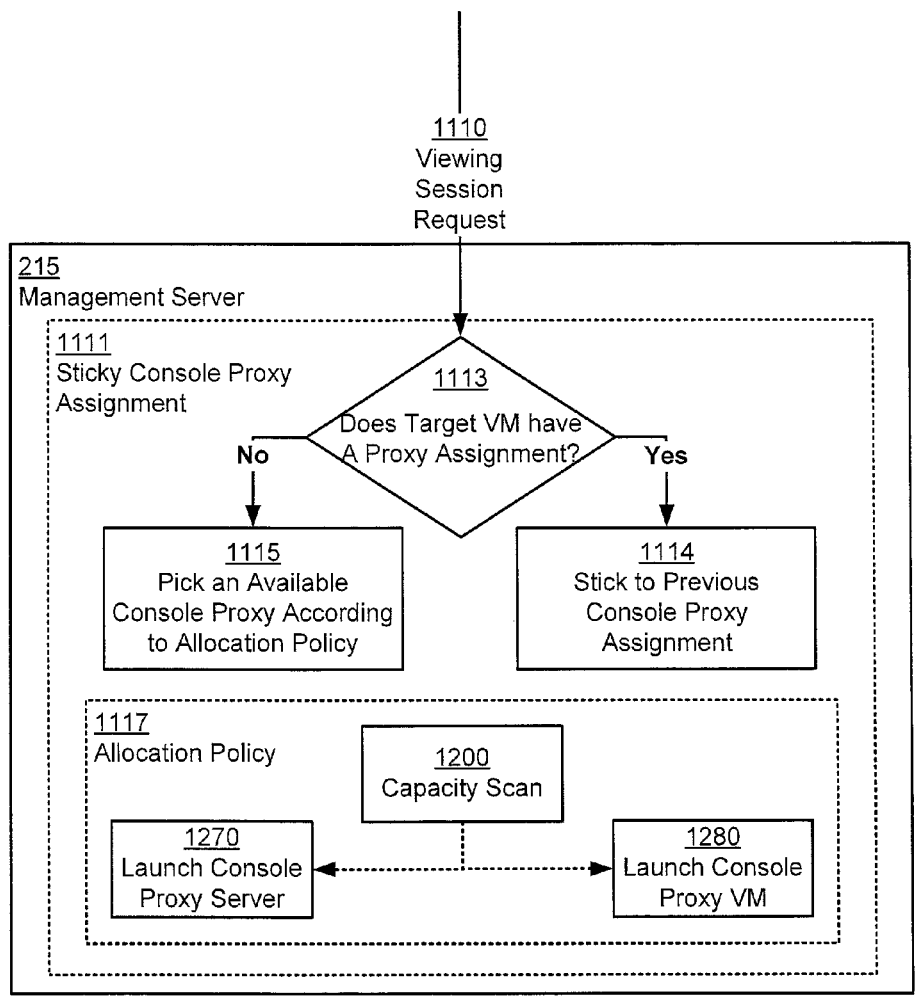
FIG. 12A is a flowchart that illustrates one embodiment of a console proxy assignment process.

FIG. 12A is a flowchart that illustrates one embodiment of console proxy assignment process 1111 of FIG. 11. In response to request 1110 for a target virtual machine 505n, management server 215 determines 1113 whether target virtual machine 505n already has a console proxy server 543 assignment. In response to the determination, if the virtual machine 505n already has console proxy server 543 assigned, the management server 215 maintains 1114 the previous assignment. If not, management server 215 allocates 1115 responsibility for the virtual machine 505n to a console proxy server 543 based on an allocation policy 1117. Allocation policy 1117 implemented on the management server 215 assigns virtual machines 505 to a console proxy server 543 until the maximum number of virtual machines 505 supported by the console proxy server 543 is reached. The maximum number is defined as the number of viewing sessions a console proxy server 543 can handle while delivering exemplary customer 205 experiences. The maximum number may be arbitrary, network address limited, or determined with test results. In response to reaching the maximum number of virtual machines 505 handled by a console proxy server 543, management server 215 instructs the console proxy virtual machine 541 to launch 1270 another console proxy server 543 or launch 1280 a new console proxy virtual machine 541. In other embodiments, allocation policy 1117 may incorporate a capacity scan 1200 to manage console proxy virtual machine 541 and console proxy server 543 creation and termination. Management server 215 may run capacity scan 1200 based on logic implemented in allocation policy 1117, on each virtual machine 505 assignment or after a number of In another embodiment, a capacity scan 1200 is carried out in response to reaching a threshold value of active console proxy servers 543 on a console proxy virtual machine 541. Additionally, management server 215 may run a capacity scan 1200 in response to a number of viewing sessions ending or other factors. Further details regarding capacity scan 1200 orchestrating the management and launch 1270 of console proxy servers and of 1280 console proxy virtual machines are described below.

Figure 12B:
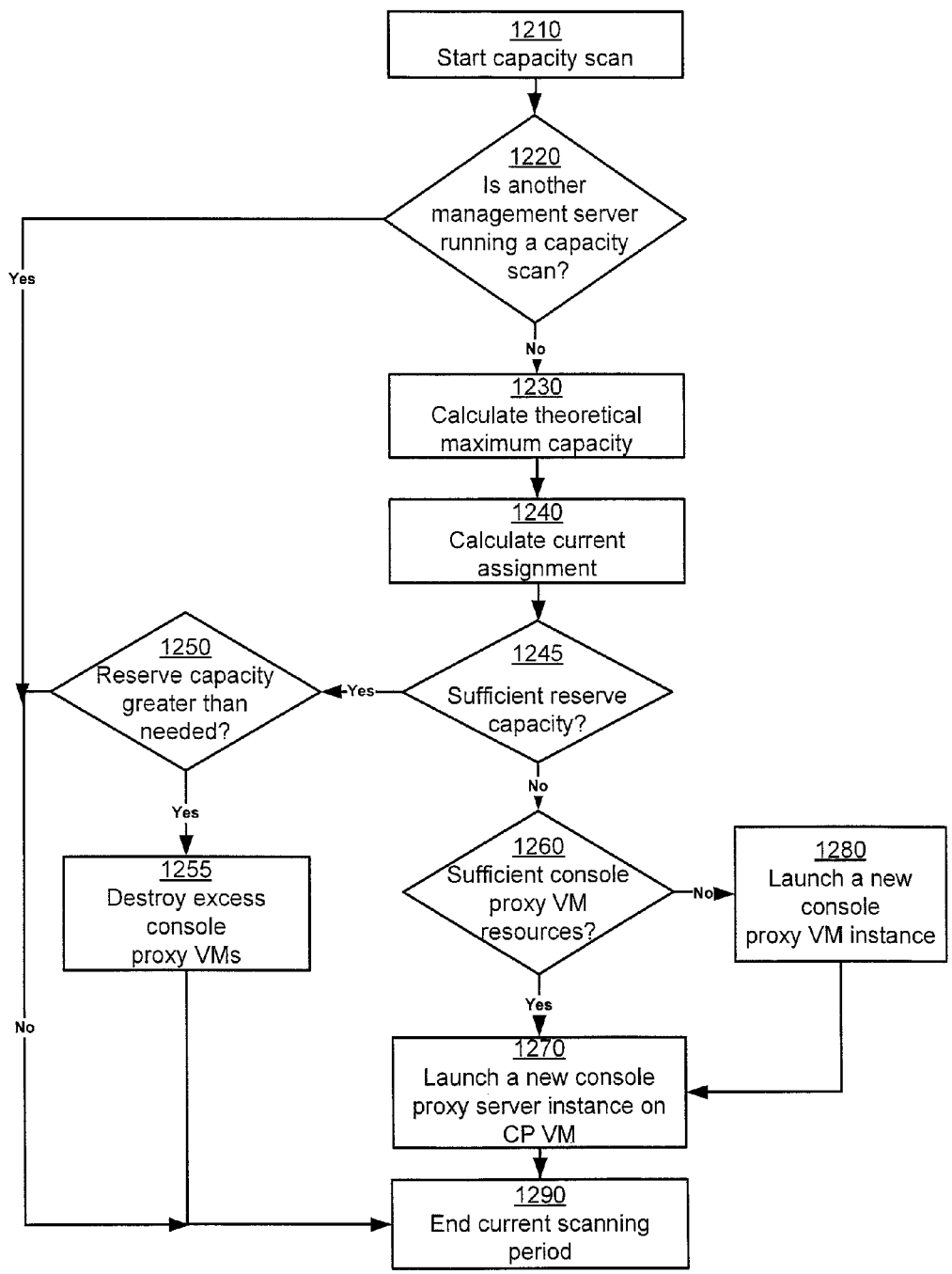
FIG. 12B is a flow chart illustrating one embodiment of a capacity scan carried out by a management server.

FIG. 12B is a flow chart illustrating one embodiment of a capacity scan of a console proxy virtual machine 541 and a console proxy server 543, as carried out by a management server 215. Management servers 215 can launch dedicated console proxy virtual machines 541 on pods 115 and instruct them to start console proxy server instances 543 to support a number of virtual machine 505 viewing sessions for customers 205. The capacity scan embodies one method of managing the current console proxy load situation and enables migration of live virtual machines 505 and dynamic allocation of proxy console resources. A capacity scan maintains a minimum number of available virtual machine 505 assignment slots, console proxy servers 543, or both. Additionally, the capacity scan may optionally terminate console proxy virtual machines 541 to maintain an upper limit of available console proxy servers 543, assignment slots or both to free unused resources. Optimally, all virtual machine 505 viewing sessions on a console proxy server 543 are terminated or transferred to a console proxy server 543 on another console proxy virtual machine 541 before termination thereof in order to provide uninterrupted viewing sessions. In some embodiments, virtual machine 505 viewing sessions are consolidated on existing or used console proxy servers 543 during the assignment process to minimize the number of console proxy servers 543 (and console proxy virtual machines 541) needed to support them.

Referring to FIG. 12B, in response to starting 1210 a capacity scan, management server 215 determines 1220 whether another management server 215 is running a scan. In embodiments with only one management server 215 this logic is optional. Responsive to continuing the scan, the management server 215 calculates 1230 the theoretical maximum capacity of supported viewing sessions on running console proxy virtual machines 541. The management server 215 also calculates 1240 the current assignment of viewing sessions in progress. The theoretical capacity and current assignment are determined from virtual machine 505 information in database 220. Database 220 includes virtual machine 505 console proxy assignments and information on running console proxy virtual machines 541. In one embodiment, an indication of sufficient reserve capacity is determined 1245 from the information calculated in 1230 and 1240. Alternatively, parameters such available viewing slots, number of running servers or virtual machine instances 505n, theoretical capacity, and current assignment are determined and operated on in a variety of methods. One skilled in the art will recognize database 220 is capable of storing information capable of indicating reserve capacity or similar as determined in block 1245.

If the determined 1245 reserve capacity is sufficient, the management server 215 may determine 1250 whether the reserve capacity is greater than needed. If the reserve capacity is greater than needed, management server 215 may destroy 1255 excess console proxy virtual machines 541. If the determined 1245 capacity is insufficient, the management server 215 may determine 1260 whether sufficient resources are available on a console proxy virtual machine 541. If sufficient resources are available on a console proxy virtual machine 541, a new console proxy server instance 543n is launched 1270 on virtual machine 541. Alternatively, management server 215 may launch 1280 a new console proxy virtual machine instance 541 entirely and launch 1270 a console proxy server instance 543 on new console proxy virtual machine 541 before ending 1290 the current scanning period.

Figure 12C:
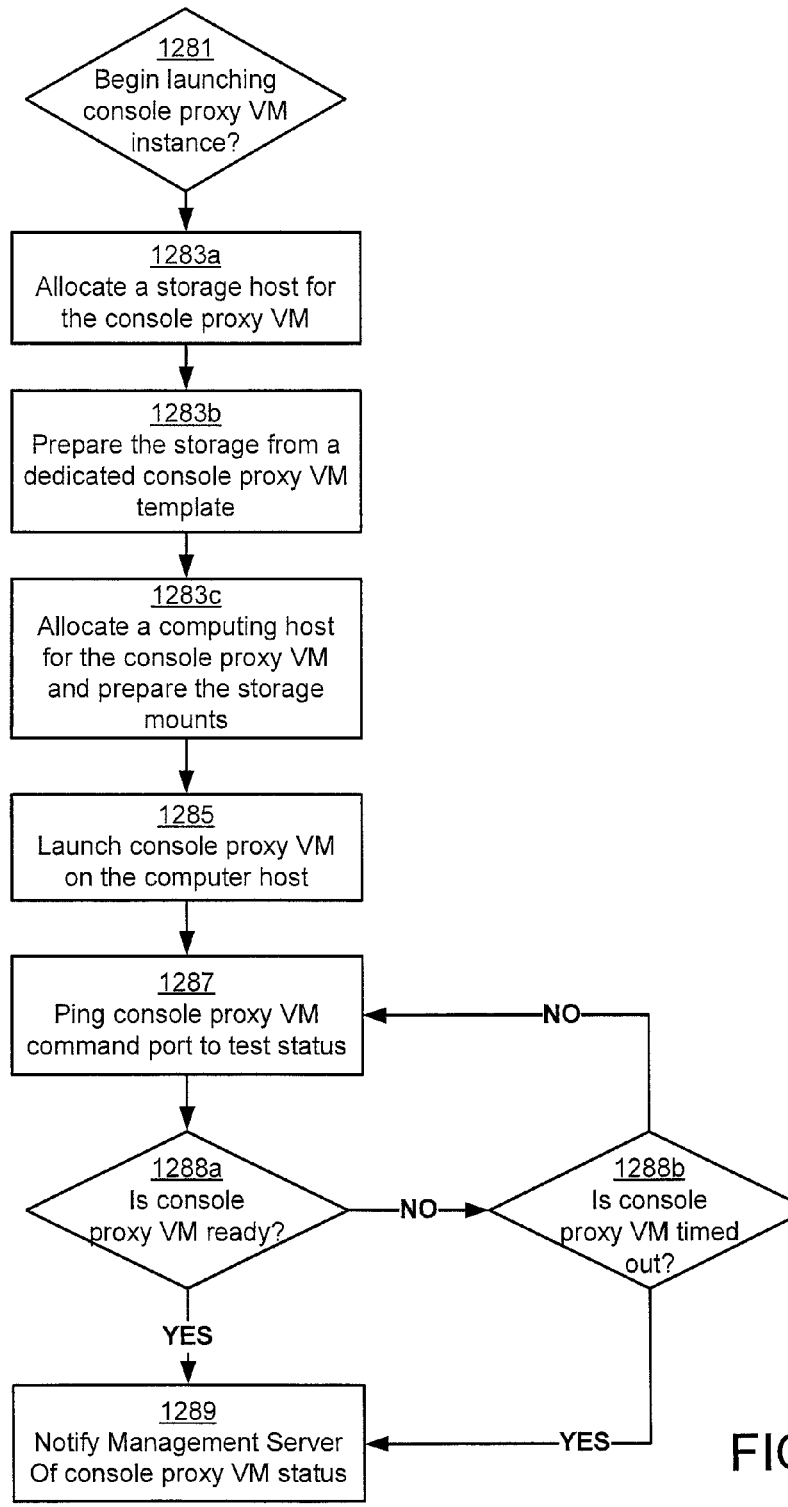
FIG. 12C is a flowchart illustrating one embodiment of the process for launching a console proxy virtual machine.

FIG. 12C is a flowchart illustrating one embodiment of the process for launching console proxy virtual machine instance 541 of FIG. 12B. Management server 215 begins launching 1281 a console proxy virtual machine instance 541 by allocating 1283 resources on a computing server 420. Management server 215 allocates 1283a a storage host within pod 115 for the console proxy virtual machine 541 and prepares 1283b the storage from a console proxy virtual machine template. Storage mounts are prepared 1283b to interface allocated computing resources on the computing host with the allocated storage resource 535 within a pod 115. Management server 215 then allocates 1283c an available computing server 420 and prepares the storage mounts for the console proxy virtual machine 541. Computing server 420 hosting launched 1285 console proxy virtual machine 541 pings 1287 the console proxy virtual machine instance 541 to determine if it is ready 1288a or timed-out after a threshold time-out period 1288b. In response to a ready response 1288a or timed-out response 1288b, the computing server 420 notifies 1289 the management server 215 that originated the initial request with the determined virtual machine status.

In one embodiment, preparing the storage 1283b for a console proxy virtual machine instance 541 comprises loading a console proxy virtual machine template onto the allocated 1283a storage server 415 resource in a pod 115. However, the storage server 415 may be placed elsewhere according to other embodiments or types of storage used in the pod architecture as long as the coupling to the computing server 420 provides the necessary data throughput. In one embodiment, the console proxy template used to prepare storage in 1283*b* may be a dedicated virtual machine wherein the computing and disk configuration is optimally configured to avoid unnecessary overhead. In one embodiment, the console proxy virtual machine template comprises a Fodera OS and automated configuration scripts for security and service auto-starting.

Console Access During Live Migration of Virtual Machines

Figure 13:
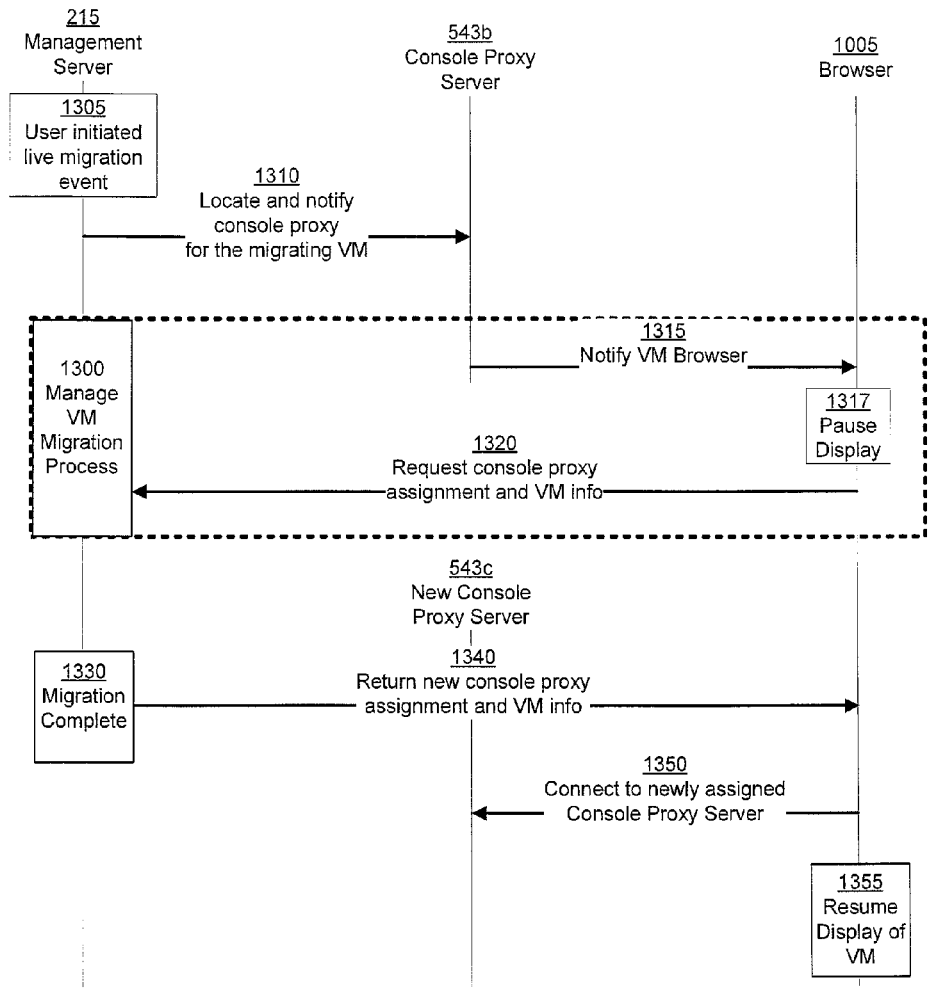
FIG. 13 illustrates an interaction diagram of an uninterrupted access session at browser during a live migration event.

FIG. 13 illustrates an interaction diagram of an uninterrupted access session at browser 1005 during a live migration event. Live migration allows the movement of virtual machines 505 from computing server 420 to another. FIG. 13 illustrates the process of transitioning a browser 1005 viewing session of a migrating virtual machine 505 to a new console proxy server 543 while preventing any loss of session continuity. In response to a user initiated 1305 live migration event, management server 215 locates and notifies 1310 the console proxy server 543*b* hosting the migrating virtual machine 505. In response to the notification event, console proxy server 543*b* notifies 1315 the corresponding browser 1005. In one embodiment the browser 1005 pauses 1317 the portion of the display viewing the virtual machine 505 during migration process 1300. In other embodiments, the browser 1005 may notify or update the user on the status of the migrated virtual machine during migration 1300 with a default, dynamic, or series of images and/or links. In one embodiment, browser 1005 requests 1320 the new console proxy server 543*c* assignment and virtual machine information at regular intervals from management server 215 until the migration process is complete 1330. Alternatively, management server 215 receives information request 1320 from browser 1005 and returns 1340 the new console proxy server assignment 543*c* and virtual machine information responsive to successful virtual machine migration 1330. Console proxy server 543*b* and new console proxy server 543*c* may reside on the same console proxy virtual machine 541, two separate console proxy virtual machine 541, or even be the same console proxy server 543 depending on the migration location and system architecture.

Responsive to the return 1340 of a new console proxy assignment and corresponding virtual machine information, browser 1005 connects 1350 to the assigned new console proxy server 543*c* according to an embodiment described in FIG. 11 and resumes 1355 the display. The connection to the newly assigned console proxy server may bypass a number of steps illustrated in FIG. 11 to prevent the loss of session continuity. When a virtual machine 505 is migrated, the networking resources and specifically the associated network addresses are the same. Thus, browser 1005 does not require re-authentication with management server 215 to access the migrated virtual machine 505. Depending on the embodiment, if all console proxy servers 543 reside on the RealHostIP.com domain, browser 1005 need only resolve 1130 the console proxy server 543 IP and TCP connect 1150 to it.

Image Striping for Display of Virtual Machine Interface

Console proxy servers 543 communicate display updates from viewed virtual machines 505 to browsers 1005 in the form of an image stripe, according to one embodiment. Image stripes comprise changed portions of a virtual machine's display for communication to the browser 1005. These changes may be communicated as a plurality of image tiles corresponding to changed areas as a single image, or image stripe. Several embodiments concerning the creation of image stripes are discussed below.

Figure 14A:
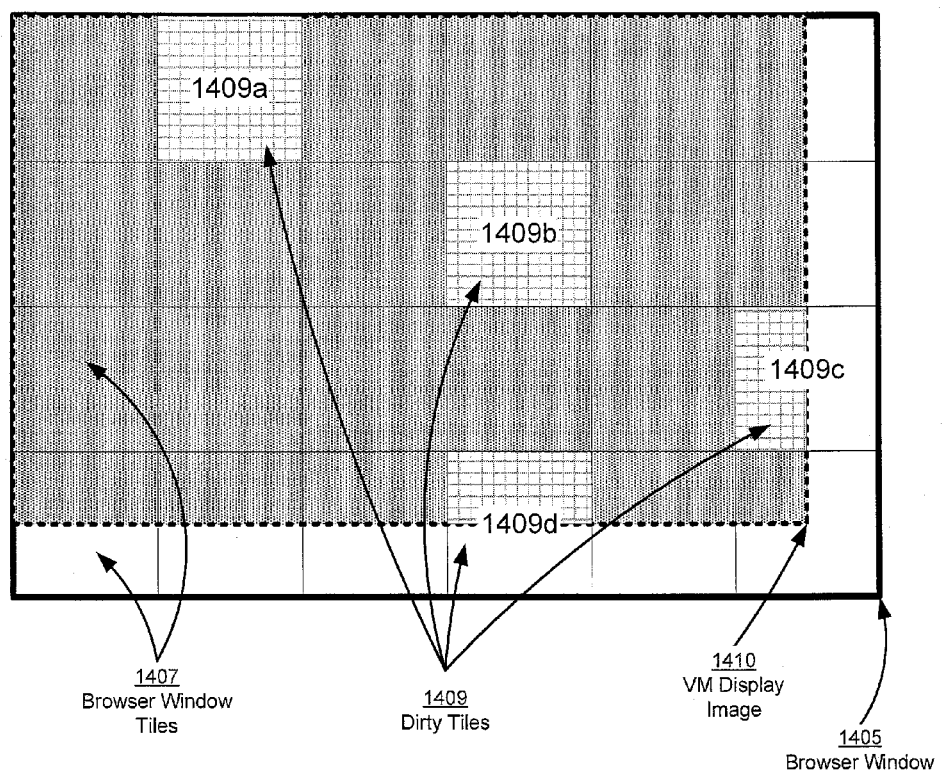
FIG. 14A-C are conceptual diagrams showing the image stripe process.
Figure 14B:
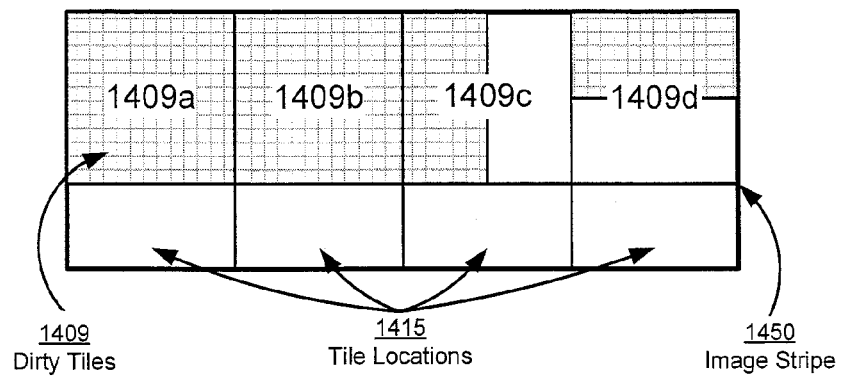
Figure 14C:
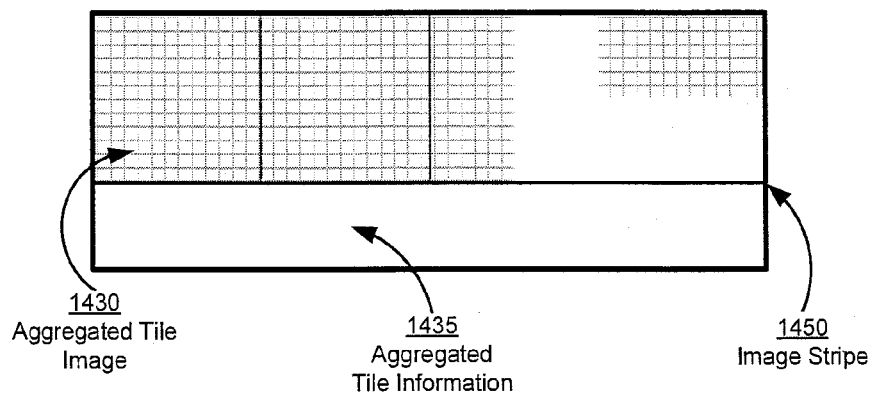

A virtual machine's display image is mapped onto tiles corresponding to discrete locations within a browser window. FIGS. 14A-C show the image stripe process. FIG. 14A illustrates tiles corresponding to discrete locations within browser window 1405, a virtual machine display image 1410. Browser tiles may correspond to the virtual machine display 1410 completely, such as tiles 1409*a* and 1409*b*, or partially, such as tiles 1409*c* and 1409*d*, depending on tile geometry or size and tile location. When virtual machine display image 1410 only partially covers a tile or number of tiles, partially covered tiles are padded to a full tile for display in the browser window 1405. Alternatively, the virtual machine display image 1410 or browser tiles 1407 may be positioned or sized in part to determine image quality or in response to browser window sizing. Additionally, overall image quality may be handled by a console proxy server 543 through compression or resize of the virtual machine display or image tiles containing display changes ("dirty tiles"), such as tiles 1409*a* through 1409*d*, included in outbound image stripe updates. In FIG. 14A, four tiles, tiles 1409*a* through 1409*d*, are marked as "dirty" since they contain pixel information that has changed since the last browser update. These tiles will be included in an image stripe 1450 for the next browser update.

FIG. 14B illustrates one embodiment of the elements included in image stripe 1450. The image stripe 1450 contains an array of tile locations 1415; while only a single line of tiles are shown in FIG. 14B, image stripes can contain multiple lines. Each tile location 1415 contains the contents of a single dirty tile 1409. The dirty tiles 1409 are arranged in the tile locations in an order that corresponds to the order they will be updated to the underlying virtual display image 1410. In one embodiment, dirty tiles 1409*a* through 1409*d* are aggregated into a single image 1430. In another embodiment, corresponding tile locations 1415, image sizes, and associated data for parsing image 1430 are communicated in an aggregated tile information 1435 string.

FIG. 14C illustrates one embodiment of the elements included in an aggregated image stripe 1450. The aggregated tile information 1435 string includes, for example, a delimited decodable information string and URL to corresponding aggregated tile image 1430. The browser is configured to retrieve image 1430 at the URL and parse it back into tiles using information 1435. In one embodiment, aggregated tile information 1435 strings are transmitted with X and Y coordinates describing tile locations 1415 and dirty tile size. Alternatively, the tile locations 1415 and dirty tile size may be communicated with row-column indications, pixel count specifying image sizes, or aggregated tile image 1430 dimensions. Browser 1005 parses one or more included decoding information types of the X and Y coordinates, the number of dirty tiles, and row-column indications to determine individual images and locations for display. One skilled in the art will recognize that many variations of X and Y formats are applicable, such as with row-column formats, pixel counts, or pixel co-ordinates, and combinations thereof After an image strip 1450 is created from dirty tiles 1409 including a display change, the dirty tiles 1409 are unmarked. Unmarking the dirty tiles 1409 indicates that another virtual machine display image 1410 image may be processed to determine a new set of dirty tiles and create a new image stripe.

Architecture of Console Proxy Virtual Machines

Figure 15:
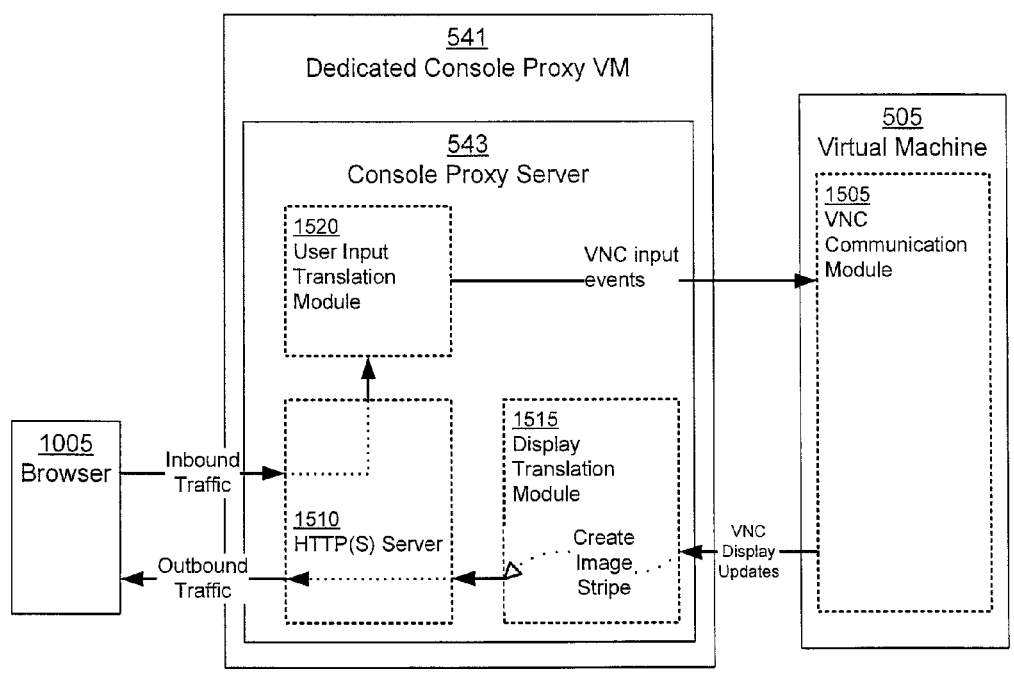
FIG. 15 illustrates one embodiment of the architecture of FIG. 10.

FIG. 15 illustrates one embodiment of the architecture of FIG. 10 in which the virtual machine 505 includes a VNC communication module 1505 and console proxy server 543 includes an HTTPS server 1510, a display translation module 1515, and an input translation module 1520.

VNC communication module 1505 within user virtual machine 505 is configured to send display changes and/or receive user input from devices such as a mouse, keyboard, touch screen, or others well known in the art. Virtual Network Computing (herein "VNC") is a graphical desktop sharing system using remote frame buffer (herein "RFB") protocol to remotely control another computer. VNC and RFB are available under General Public License and easily extensible for custom applications. While VNC protocol is discussed herein in several embodiments, any protocol layer or driver set capable of communicating display and/or user input can provide an acceptable communication layer or protocol for data communication between console proxy server 543 and user virtual machine 505.

HTTPS server 1510 is capable of combining the Hypertext Transfer Protocol with the SSL/TLS protocol to provide encrypted communication and secure identification of a network web server. Display translation module 1515 receives display updates from VNC communication module 1505 in native VNC protocol and translates them into an HTTPS-based protocol. According to some embodiments, display translation module 1515 creates image stripes 1450 from received display updates. User input translation module 1520 is configured to transmit input events to VNC communication module 1505.

In use, HTTPS server 1510 communicates outbound display updates to and receives inbound user input from browser 1005. HTTP provides inherent firewall 320 integration over networks (e.g., 230) as HTTP is typically allowed without specific network considerations for customer 205 traffic. Outbound traffic results from a GET request; GET commands request a representation of the specified resource. Multiple GET commands comprise the data sent as outbound traffic. For example, browser 1005 may use a GET request to retrieve aggregated tile image 1430 and associated tile information 1435 from a specified location. Alternatively, browser 1005 may use a GET request to retrieve the location of aggregated tile image 1430 and associated tile information 1435 and use a number of subsequent GET requests to retrieve the data. Inbound traffic results from a POST request or number of; POST commands submit data to be process to the identified resource. For example, browser 1005 may use a POST request or number of such requests to communicate input events. Alternatively, any networking protocol or transport layer capable of data transfer between a client and server may be used.

In one embodiment, HTTPS server 1510 is configured to send image stripes created in display translation module 1515 as outbound traffic and associated data in packets to browser 1005 in response to corresponding requests. HTTPS servers are well known in the art and capable of the functionality described herein.

In one embodiment, browser 1005 may communicate user input to virtual machine 505 through console proxy server 543. In the present embodiment, for example, browser 1005 aggregates input events and communicates a first in first out ("FIFO") order for said events in an inbound packet. In one embodiment, a HTTPS server 1510 capable of receiving POST requests receives inbound traffic containing aggregated user input packets from browser 1005. In one embodiment, user input translation module 1520 accesses the aggregated user input data received by HTTPS server 1510 and translates the input into appropriate VNC protocol.

In another embodiment, HTTPS server 1510 sends user input POST packets or the location of received and stored user input POST packets to input translation module 1520. In one embodiment, input translation module 1520 transmits VNC input according to the FIFO order of the aggregated events communicated in the POST data to the VNC module 1505 on virtual machine 505; thus preserving the original user input sequences as recorded and aggregated at browser 1005.

Figure 16:
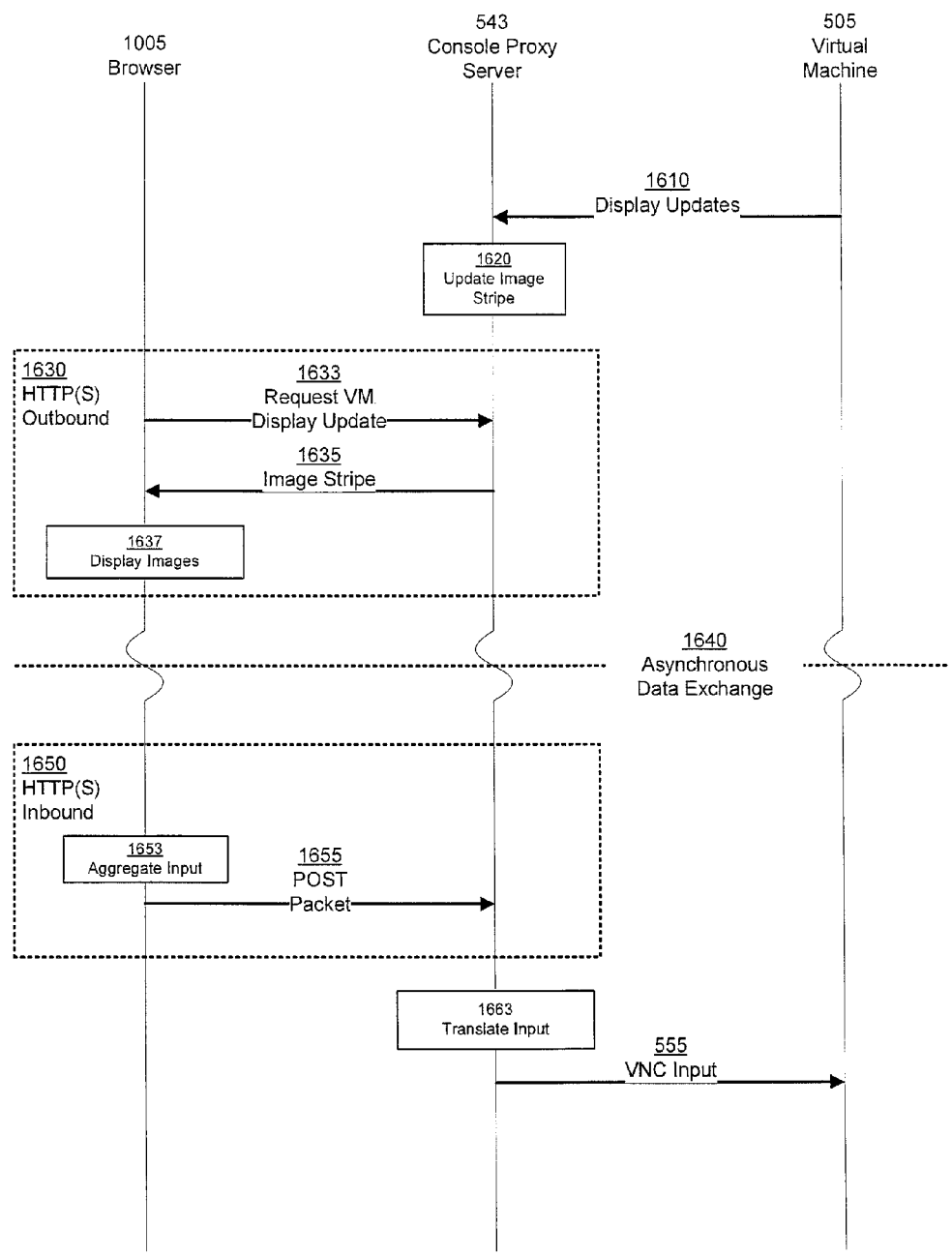
FIG. 16 illustrates one embodiment of an asynchronous HTTPS data exchange between a browser and a console proxy server.

FIG. 16 illustrates an embodiment of HTTPS data exchange 1170 between console proxy server 543 and browser 1005 in FIG. 11. Console proxy server 543 receives 1610 display updates from viewed virtual machine 505 and updates 1620 an image stripe for transmission to browser 1005. The browser 1005 requests 1633 a virtual machine display update. In one embodiment, browser 1005 initiates request 1633 at user specified time intervals, a desired quality or refresh rate. In other embodiments, a determination of available bandwidth affects the frequency of requests 1633 and transmitted image stripes. In response to receiving 1635 an image stripe, browser 1005 can display 1637 the updated virtual machine display image using the image stripe. In some embodiments, transmitted 1635 image stripes contain information corresponding to updated images, such as a URL descriptor, causing browser 1005 to initiate further HTTP requests, for example a GET command, to obtain updated images for display 1637 in browser 1005.

Browser 1005 uses AJAX to facilitate asynchronous 1640 bi-directional communication of HTTPS outbound 1630 and HTTPS inbound 1650 data. The asynchronous data exchange 1640 represents that the processes above and below the lines may occur simultaneously or in any order. The order of the illustrated elements is meant to convey the conceptual order of events and not necessarily the actual order. Accordingly, AJAX enabled browser 1005 polls 1633 console proxy server 543 for updated image stripes using HTTPS protocol while asynchronously transmitting other data such as user input. Input is aggregated 1653 at browser 1005 and transmitted asynchronously 1655 as a POST request packet to console proxy server 543. Alternatively, input may be transmitted in response to a display update 1637 at browser 1005 or any other suitable method. Responsive to receiving post packet 1655, console proxy server 543 translates the packet into user input for transmission to virtual machine 505.

AJAX facilitates the aggregation 1653 of input from devices such as a mouse, keyboard, touch screen, or others well known in the art. For example, if a number of mouse events occur within some temporal period, they are collapsed into a single event. In one embodiment, a plurality of events may undergo further aggregation and serialization before transmission. Input events are aggregated in a way to preserve FIFO as communicated by the input devices. Timestamps, numbering methods, and inherent data ordering are several ways well known in the art to appropriately communicate a FIFO order. In one embodiment, following the creation of packets containing aggregated 1653 input events, packet POST requests 1655 are also queued in FIFO order by browser 1005 to maintain FIFO event translation at a console proxy server 543.

AJAX facilitates asynchronous data transfer; however, other technologies can provide similar functionality. For example, browser 1005 may be a standalone application and communicate with console proxy server 543 using the illustrated HTTPS method, a proprietary data exchange format, or any other protocol capable of communicating image and user input events. Other embodiments may include a browser 1005 with limited functionality; in such embodiments the browser may only participate in a portion of the processes discussed herein, use a modified set of commands such as a mobile specific API and other communication methods well known in the art, or use limited processing methods for the image stripes and user input, as is typical with a number of mobile devices.

Figure 17:
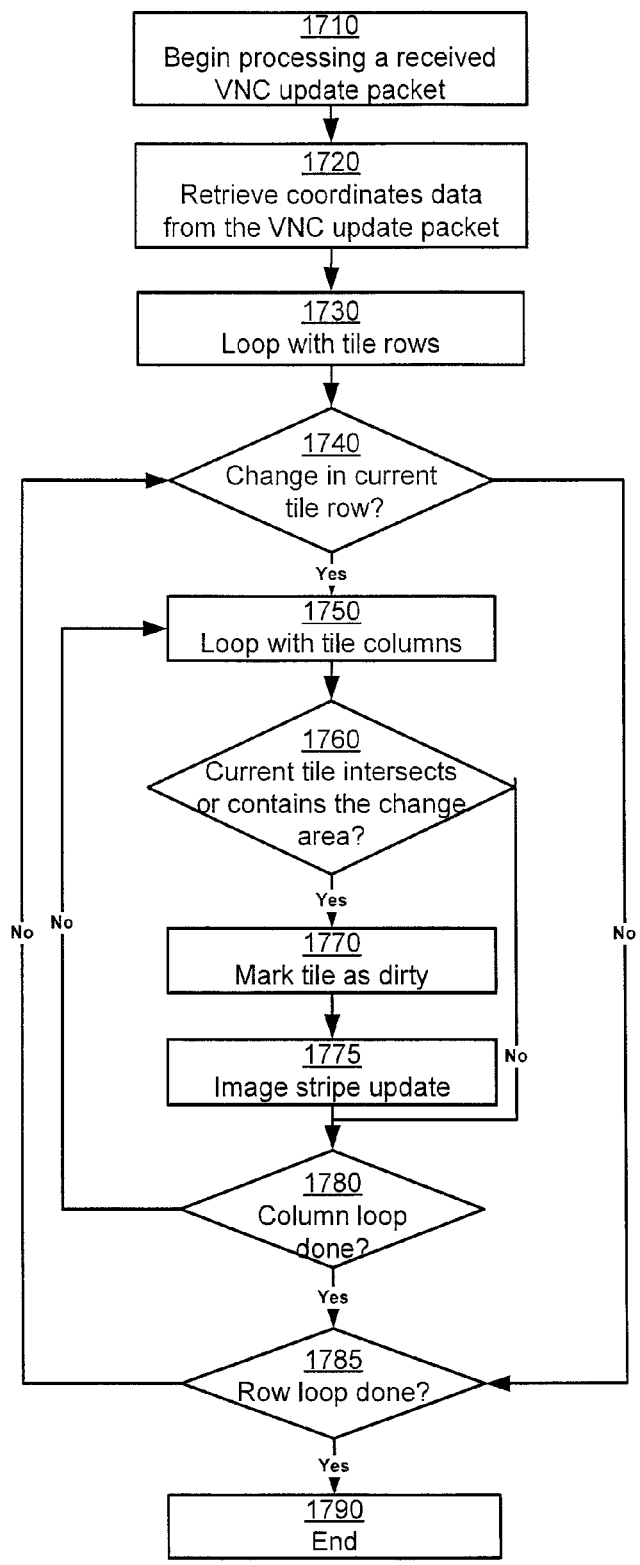
FIG. 17 illustrates a block diagram demonstrating one embodiment of tracking virtual machine display changes for an image stripe.

FIG. 17 illustrates a block diagram demonstrating one embodiment of tracking VM display changes for an image stripe. The VNC module residing on a user VM determines areas of display changes to communicate in a VNC display update packet. In response to receiving a VNC update packet packets comprising display change coordinates and associated image data, the display translation module residing on a console proxy server begins 1710 processing packet and retrieves 1720 coordinate data indicative of the location where image changes occur.

Tile rows are looped 1730 with the retrieved 1720 VNC image coordinates to determine 1740 whether a change occurs in the current tile row. In the present embodiment, a change indicates any image update within a determined tile area. Changes include, for example, an update intersection with a tile boundary or an update wholly contained within a tile. After determining 1740 whether a change occurs in the current tile row, the update is looped 1750 with the tile columns in the current row. Any changes within each tile column 1760 are determined for the current row. In the present embodiment, tiles with changes are marked 1770 as dirty to indicate a display change occurred and updated 1775 in the image stripe being readied.

In one embodiment, the entire update process of FIG. 17 concludes before image stripe updates are made available to the HTTP server. Accordingly, the update process loops through each column 1780 and row 1785 to determine all image changes contained in the VNC display update packet before ending 1790. In other embodiments, the HTTP server may accesses partially readied image stripe updates on browser request throughout the process.

While a row-column incremental scan is implemented in FIG. 17, one skilled in the art will recognize that other scanning and update methods applicable as well, some of which are discussed herein. For example, hysteresis logic can be implemented to determine which tiles are frequently dirty and in response, scan those tiles more often than others. In other embodiments, steps for abandoning the current update process when a new packet is received may be implemented. Accordingly, the update process may continue from a previous location, begin in a different sector, or implement the hysteresis logic outlined above.

In accordance with embodiments discussed herein, only tiles containing image changes are included in an image stripe update for HTTP communication to the browser. Thus, the browser-proxy server HTTP data exchange requires only the bandwidth needed to communicate display changes.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising computer program code stored on a non-transitory, tangible computer readable storage medium, which is configured to be executed by a computer system for performing any or all of the steps, operations, or processes described. A computer system is understood to include one or more computers, each computer including one or more hardware-based processors, primary memory devices (e.g., RAM, ROM), secondary storage devices (e.g., hard discs or solid state memory), and networking devices (e.g., networking interface cards). The computers in a computer system can be interconnected by wired medium (e.g. Ethernet, fiber optic), or wireless medium (e.g., radio-based networks, such as 802.11, 802.16), or combination thereof.

Embodiments of the invention may also relate to an apparatus for performing the operations herein. This apparatus may be specially constructed for the required purposes, and/or it may comprise a general-purpose computing device selectively activated or reconfigured by a computer program stored in the computer.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method of managing display of virtual machine display windows on a console client machine, comprising:
    instantiating a console proxy server having first connections to a plurality of user virtual machines and having a second connection to the console client machine, the first connections using a remote frame buffer protocol by which the virtual machines specify updates to respective virtual machine display windows, the console client machine executing a browser having a browser window in which the virtual machine display windows of the user virtual machines are displayed;
    by the console proxy server, maintaining a mapping between browser window tile areas of the browser window and respective tile areas of one of the virtual machine display windows, the mapping reflecting a dynamically variable size and location of the virtual machine display window in the browser window; and
    by the console proxy server in response to an update to the virtual machine display window received from the respective virtual machine via the respective first connection:

determining respective areas of the virtual machine display window that are changed by the update, and using the mapping to identify respective changed tile areas of the virtual machine display window and corresponding browser window tile areas;

creating an image stripe including image data for only the changed tile areas of the virtual machine display window; and transmitting the image stripe to the console client machine via the second connection to update the browser window, the image stripe being accompanied by location information identifying respective browser tile areas to be updated with corresponding image data of the image stripe.

2. A method according to claim 1, wherein:

the virtual machine display window occupies less than an entire extent of the browser window; and the browser window tile areas collectively span an entire extent of the browser window and include (a) first tile areas fully occupied by respective interior portions of the virtual machine display window, and (b) second tile areas including respective edge portions of the virtual machine display window and respective adjacent portions of the browser window not occupied by the virtual machine display window.

3. A method according to claim 1, wherein receiving the update to the virtual machine display window includes receiving an update to a remote frame buffer in a graphical remote desktop sharing scheme, and wherein determining respective areas of the virtual machine display window that are changed includes translating the updates into the changed tile areas of the virtual machine display window.

4. A method according to claim 1, wherein the image data of the image stripe is arranged as a set of tile locations, each tile location including (a) an image tile for a respective changed tile area of the virtual machine display window, and (b) a respective portion of the location information, the portion identifying a respective browser window tile area to be updated with the image tile.

5. A method according to claim 1, wherein the image data of the image stripe is arranged as an aggregated single image and aggregated tile information, the aggregated tile information including tile location information identifying respective locations of image tiles in the aggregated single image, each image tile to be used to update a corresponding browser window tile area.

6. A method according to claim 5, wherein the aggregated tile information includes a resource locator string usable by the browser to retrieve the aggregated single image from a remote location for further processing to segregate the image tiles for use in updating the browser window.

7. A method according to claim 1, wherein the console proxy server includes a display translation module and a user input translation module, the display translation module being operative to perform the mapping-maintaining, determining, creating and transmitting steps, the user input translation module being operative to process inbound traffic representing user input events at the console client machine, the processing including translating input data of the inbound traffic into user input notifications and transmitting the user input notifications to the respective virtual machine using the remote frame buffer protocol.

8. A method according to claim 1, wherein the tile areas are arranged in a two-dimensional grid having rows and columns, and wherein determining respective areas of the virtual machine display window that are changed by the update includes a two-level looping for all the rows and columns, the two-level looping having an inner sequence including:

a test for intersection of a current row and column with a changed area of the virtual machine display window; and only in the event that the test is satisfied, (a) marking a current tile as requiring an update, and (b) updating the image stripe with updated image data for the current tile.

9. A method according to claim 8, wherein a partially readied image stripe is transmitted to the browser upon request prior during but prior to completion of the two level looping.

10. A method according to claim 1, wherein determining respective areas of the virtual machine display window that are changed by the update includes (a) maintaining information about respective frequencies at which respective tile areas of the virtual machine display window are changed, and (b) based on the information, adjusting relative frequencies at which respective tile areas of the virtual machine display window are checked for a need for updating.

11. A non-transitory computer-readable medium having computer program instructions recorded thereon, the instructions being executable by a computerized device to cause the computerized device to perform a method of managing display of virtual machine display windows on a console client machine, the method including:

instantiating a console proxy server having first connections to a plurality of user virtual machines and having a second connection to the console client machine, the first connections using a remote frame buffer protocol by which the virtual machines specify updates to respective virtual machine display windows, the console client machine executing a browser having a browser window in which the virtual machine display windows of the user virtual machines are displayed;

by the console proxy server, maintaining a mapping between browser window tile areas of the browser window and respective tile areas of one of the virtual machine display windows, the mapping reflecting a dynamically variable size and location of the virtual machine display window in the browser window; and by the console proxy server in response to an update to the virtual machine display window received from the respective virtual machine via the respective first connection:

determining respective areas of the virtual machine display window that are changed by the update, and using the mapping to identify respective changed tile areas of the virtual machine display window and corresponding browser window tile areas;

creating an image stripe including image data for only the changed tile areas of the virtual machine display window; and transmitting the image stripe to the console client machine via the second connection to update the browser window, the image stripe being accompanied by location information identifying respective browser tile areas to be updated with corresponding image data of the image stripe.

12. A non-transitory computer-readable medium according to claim 11, wherein:

the virtual machine display window occupies less than an entire extent of the browser window; and the browser window tile areas collectively span an entire extent of the browser window and include (a) first tile areas fully occupied by respective interior portions of the virtual machine display window, and (b) second tile areas including respective edge portions of the virtual machine display window and respective adjacent portions of the browser window not occupied by the virtual machine display window.

13. A non-transitory computer-readable medium according to claim 11, wherein receiving the update to the virtual machine display window includes receiving an update to a remote frame buffer in a graphical remote desktop sharing scheme, and wherein determining respective areas of the virtual machine display window that are changed includes translating the updates into the changed tile areas of the virtual machine display window.

14. A non-transitory computer-readable medium according to claim 11, wherein the image data of the image stripe is arranged as a set of tile locations, each tile location including (a) an image tile for a respective changed tile area of the virtual machine display window, and (b) a respective portion of the location information, the portion identifying a respective browser window tile area to be updated with the image tile.

15. A non-transitory computer-readable medium according to claim 11, wherein the image data of the image stripe is arranged as an aggregated single image and aggregated tile information, the aggregated tile information including tile location information identifying respective locations of image tiles in the aggregated single image, each image tile to be used to update a corresponding browser window tile area.

16. A non-transitory computer-readable medium according to claim 15, wherein the aggregated tile information includes a resource locator string usable by the browser to retrieve the aggregated single image from a remote location for further processing to segregate the image tiles for use in updating the browser window.

17. A non-transitory computer-readable medium according to claim 11, wherein the console proxy server includes a display translation module and a user input translation module, the display translation module being operative to perform the mapping-maintaining, determining, creating and transmitting steps, the user input translation module being operative to process inbound traffic representing user input events at the console client machine, the processing including translating input data of the inbound traffic into user input notifications and transmitting the user input notifications to the respective virtual machine using the remote frame buffer protocol.

18. A non-transitory computer-readable medium according to claim 11, wherein the tile areas are arranged in a two-dimensional grid having rows and columns, and wherein determining respective areas of the virtual machine display window that are changed by the update includes a two-level looping for all the rows and columns, the two-level looping having an inner sequence including:

a test for intersection of a current row and column with a changed area of the virtual machine display window; and only in the event that the test is satisfied, (a) marking a current tile as requiring an update, and (b) updating the image stripe with updated image data for the current tile.

19. A non-transitory computer-readable medium according to claim 18, wherein a partially readied image stripe is transmitted to the browser upon request prior during but prior to completion of the two level looping.

20. A non-transitory computer-readable medium according to claim 11, wherein determining respective areas of the virtual machine display window that are changed by the update includes (a) maintaining information about respective frequencies at which respective tile areas of the virtual machine display window are changed, and (b) based on the information, adjusting relative frequencies at which respective tile areas of the virtual machine display window are checked for a need for updating.

* * * * *